(12) United States Patent
Ishida et al.

(10) Patent No.: US 11,659,113 B2
(45) Date of Patent: May 23, 2023

(54) IMAGE READING DEVICE AND IMAGE FORMING APPARATUS

(71) Applicant: FUJIFILM Business Innovation Corp., Tokyo (JP)

(72) Inventors: Tomomi Ishida, Kanagawa (JP); Ryusuke Nakata, Kanagawa (JP); Tomonori Sato, Kanagawa (JP); Kazuyuki Koda, Kanagawa (JP); Isamu Adachi, Kanagawa (JP); Miho Morita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/567,150

(22) Filed: Jan. 2, 2022

(65) Prior Publication Data
US 2023/0057067 A1 Feb. 23, 2023

(30) Foreign Application Priority Data

Aug. 23, 2021 (JP) .............................. JP2021-135517

(51) Int. Cl.
*H04N 1/00* (2006.01)

(52) U.S. Cl.
CPC ..... *H04N 1/00543* (2013.01); *H04N 1/00554* (2013.01); *H04N 1/00795* (2013.01)

(58) Field of Classification Search
CPC .......... H04N 1/00615; H04N 1/00588; H04N 2201/0081; H04N 5/2354; H04N 1/00602; H04N 1/00013; H04N 1/00031; H04N 1/00045; H04N 1/00063; H04N 1/00087; H04N 1/04; H04N 1/0057; H04N 1/1017; H04N 1/00591; H04N 1/00543; H04N 1/12; H04N 7/18; H04N 1/0005; H04N 2201/0082; H04N 2201/0094; H04N 2201/0412; H04N 1/00002; H04N 1/00023; H04N 1/00068; H04N 1/00076; H04N 1/0062; H04N 1/00633; H04N 1/0066;
(Continued)

(56) References Cited

U.S. PATENT DOCUMENTS

| | | | | |
|---|---|---|---|---|
| 6,064,498 | A * | 5/2000 | Taniguchi | .......... H04N 1/00543 271/3.03 |
| 7,710,614 | B2 * | 5/2010 | Hanamoto | ............... B41J 29/02 358/474 |

(Continued)

FOREIGN PATENT DOCUMENTS

JP   2021068980   4/2021

*Primary Examiner* — Negussie Worku
(74) *Attorney, Agent, or Firm* — JCIPRNET

(57) ABSTRACT

An image reading device includes a housing that includes a transport path along which a document is transported, an opening and closing member that is attached to the housing in such a manner as to be openable and closable, a reading unit that is disposed in such a manner as to be positioned between the transport path and the opening and closing member and that reads an image from the document, which is transported along the transport path, and an opposing member that is disposed in such a manner as to be opposed to the reading unit with the transport path interposed between the opposing member and the reading unit and that is moved away from the reading unit in conjunction with an opening operation of the opening and closing member.

20 Claims, 17 Drawing Sheets

(58) Field of Classification Search
CPC ........... H04N 1/00814; H04N 1/00835; H04N 2201/044; H04N 1/024; H04N 1/193; H04N 1/327; H04N 1/00015; H04N 1/00551; H04N 1/00604; H04N 1/00612; H04N 1/00795; H04N 1/02409; H04N 2201/02402; H04N 1/00572; H04N 1/00599; H04N 1/00628; H04N 1/00909; H04N 1/00976; H04N 1/0305; H04N 1/125; H04N 2201/02404; H04N 1/00241; H04N 1/0032; H04N 1/00559; H04N 1/00649; H04N 1/00689; H04N 1/0692; H04N 1/1013; H04N 1/107; H04N 1/32; H04N 5/2257; H04N 1/00554; H04N 1/0061; H04N 1/00623; H04N 1/00668; H04N 1/00732; H04N 1/02463; H04N 1/121; H04N 1/2032; H04N 1/207; H04N 1/4076; H04N 2201/02497; H04N 2201/0406; H04N 2201/0408; H04N 5/2252; H04N 5/2253; H04N 7/183; H04N 1/00; H04N 1/00204; H04N 1/00251; H04N 1/00326; H04N 1/00334; H04N 1/00525; H04N 1/00557; H04N 1/00562; H04N 1/00567; H04N 1/00647; H04N 1/00912; H04N 1/08; H04N 1/1008; H04N 1/17; H04N 1/29; H04N 1/32133; H04N 1/34; H04N 1/4072; H04N 13/128; H04N 2201/0091; H04N 2201/0458; H04N 2201/3225; H04N 2201/3226; H04N 2201/3242; H04N 5/2251; H04N 5/2256; H04N 5/23216; H04N 5/23229; H04N 5/33; H04N 7/164; H04N 7/181; G03G 15/5062; G03G 15/04036; G03G 21/1623; G03G 2221/1684; G03G 21/1633; G03G 15/5041; G03G 15/602; G03G 2221/1687; G03G 2221/169; G03G 15/0189; G03G 15/0884; G03G 15/1665; G03G 21/1666; G03G 2215/00544; G03G 2215/00616; G03G 2215/00759; G03G 2215/0158; G03G 2221/1651; G03G 2221/166; G03G 2221/1678; G03G 15/00; G03G 15/11; G03G 15/28; G03G 15/30; G03G 15/6502; G03G 15/6511; G03G 15/6529; G03G 15/6558; G03G 15/6567; G03G 21/1638; G03G 21/1853; G03G 2215/00409; G03G 2215/00561; G03G 2215/00675; G03G 2215/0125; G03G 2215/0141; G03G 2221/1675; G03G 2221/1869; G03G 15/01; G03G 15/08; G03G 15/0822; G03G 15/0865; G03G 15/087; G03G 15/0872; G03G 15/0877; G03G 15/0879; G03G 15/0896; G03G 15/0898; G03G 15/09; G03G 15/0942; G03G 15/2028; G03G 15/50; G03G 15/5037; G03G 15/60; G03G 21/0011; G03G 21/02; G03G 21/06; G03G 21/1609; G03G 21/1619; G03G 21/1628; G03G 21/18; G03G 21/1821; G03G 21/1878; G03G 2215/00042; G03G 2215/00105; G03G 2215/00396; G03G 2215/00405; G03G 2215/0174; G03G 2215/0678; G03G 2221/1606; G03G 2221/163; G03G 2221/1636; G03G 2221/1657; B65H 2801/39; B65H 2405/3321; B65H 3/0684; B65H 5/062; B65H 29/08; B65H 29/28; B65H 5/32; B65H 3/5223; B65H 3/0669; B65H 1/04; B65H 2404/1531; B65H 2404/6111; B65H 3/063; B65H 2220/01; B65H 2405/324; B65H 2601/11; B65H 29/14; B65H 2402/35; B65H 2402/441; B65H 2404/133; B65H 2404/694; B65H 2801/06; B65H 23/08; B65H 2301/41376; B65H 2301/51538; B65H 2404/1521; B65H 2405/422; B65H 2511/12; B65H 2511/13; B65H 2511/40; B65H 2511/416; B65H 2511/512; B65H 2513/20; B65H 2515/10; B65H 2553/43; B65H 2557/242; B65H 2701/12422; B65H 2701/1944; B65H 2701/51; B65H 3/5238; B65H 5/06; B65H 2404/14211; B65H 2405/1117; B65H 2405/12; B65H 2601/321; B65H 3/52; B65H 3/5207; B65H 2407/21; B65H 3/34; B65H 31/02; B65H 1/02; B65H 2220/02; B65H 2301/4232; B65H 2404/1313; B65H 2404/1341; B65H 2404/63; B65H 2405/313; B65H 2405/325; B65H 3/0661; B65H 31/26; B65H 5/068; B65H 2402/54; B65H 2404/24; B65H 29/12; B65H 3/56; B65H 5/26; B65H 2402/30; B65H 2402/45; B65H 2404/1431; B65H 2404/52; B65H 2404/5511; B65H 2404/56; B65H 2404/64; B65H 2405/1118; B65H 2405/2111; B65H 2601/324; B65H 29/20; B65H 29/52; B65H 3/0653; B65H 3/42; B65H 3/44; B65H 3/5215; B65H 3/5261; B65H 3/66; B65H 5/36; B65H 7/02; B65H 7/12; B65H 7/125; B65H 1/14; B65H 2301/4212; B65H 2301/42122; B65H 2404/1421; B65H 2404/143; B65H 2404/261; B65H 2511/414; B65H 2513/42; B65H 2801/03; B65H 29/50; B65H 29/51; B65H 29/58; B65H 29/60; B65H 3/0676; B65H 2220/09; B65H 2301/51214; B65H 2403/50; B65H 2403/72; B65H 2404/17; B65H 2404/611; B65H 2404/6112; B65H 2404/692; B65H 2404/6942; B65H 2404/725; B65H 2405/1124; B65H 2405/115; B65H 2406/11; B65H 2407/50; B65H 2601/111; B65H 2601/2612; B65H 2701/1914; B65H 2701/1916; B65H 2701/1924; B65H 29/70; B65H 3/0638; B65H 3/08; B65H 3/46; B65H 3/48; B65H 3/565; B65H 39/043; B65H 5/38; B65H 7/18; B65H 9/006; B65H 1/06; B65H 1/08; B65H 15/00; B65H 16/106; B65H 18/028; B65H 18/103; B65H 18/26; B65H 20/02; B65H 23/0216; B65H 23/032; B65H 2301/36212; B65H 2403/42; B65H 2403/481; B65H 2403/724; B65H 2404/15212; B65H 2404/7414; B65H 2405/1111; B65H 2405/1114; B65H 2405/11151; B65H 2405/114; B65H 2405/11425; B65H 2405/3311; B65H 2405/332; B65H 2405/354; B65H 2407/51; B65H 2511/10;

B65H 2511/214; B65H 2513/41; B65H 2513/51; B65H 2515/34; B65H 2553/30; B65H 2553/82; B65H 2601/325; B65H 2701/1131; B65H 2701/1133; B65H 2701/31; B65H 2801/12; B65H 2801/48; B65H 29/22; B65H 29/48; B65H 29/62; B65H 3/523; B65H 3/54; B65H 31/24; B65H 31/34; B65H 5/00; B65H 5/021; B65H 5/023; B65H 5/025; B65H 67/063; B65H 67/069; B65H 7/04; B65H 9/08; B65H 9/166

See application file for complete search history.

(56) References Cited

U.S. PATENT DOCUMENTS

| | | | | |
|---|---|---|---|---|
| 9,787,865 | B2* | 10/2017 | Yang | H04N 1/00551 |
| 2004/0114979 | A1* | 6/2004 | Nanno | G03G 15/234 |
| | | | | 399/401 |
| 2009/0123175 | A1* | 5/2009 | Takemoto | G03G 21/1623 |
| | | | | 399/107 |
| 2013/0106053 | A1* | 5/2013 | Mizuno | B65H 1/02 |
| | | | | 271/264 |
| 2016/0212278 | A1* | 7/2016 | Yamazaki | B65H 7/14 |
| 2020/0299095 | A1* | 9/2020 | Takahashi | B65H 29/52 |
| 2020/0310320 | A1* | 10/2020 | Nakata | B65H 1/266 |
| 2021/0120137 | A1* | 4/2021 | Okamoto | H04N 1/12 |
| 2021/0203799 | A1* | 7/2021 | Uji | H04N 1/00588 |
| 2022/0131994 | A1* | 4/2022 | Hozono | H04N 1/1061 |
| 2022/0150372 | A1* | 5/2022 | Matsumoto | H04N 1/1061 |
| 2022/0210282 | A1* | 6/2022 | Morinaga | B41J 29/38 |
| 2022/0303412 | A1* | 9/2022 | Kawabata | H04N 1/00559 |

* cited by examiner

IMAGE READING DEVICE AND IMAGE FORMING APPARATUS

CROSS-REFERENCE TO RELATED APPLICATIONS

This application is based on and claims priority under 35 USC 119 from Japanese Patent Application No. 2021-135517 filed Aug. 23, 2021.

BACKGROUND (i) Technical Field

The present disclosure relates to an image reading device that reads an image and an image forming apparatus that includes the image reading device.

(ii) Related Art

Japanese Unexamined Patent Application Publication No. 2021-68980 discloses a document reading device including a document placement table that is provided with a document reading unit and an auto document feeder that is supported by the document placement table so as to be pivotable between a closed position at which the auto document feeder covers the upper surface of the document placement table and an open position at which the auto document feeder exposes the upper surface of the document placement table. In addition, Japanese Unexamined Patent Application Publication No. 2021-68980 discloses an image forming apparatus that includes the above-described document reading device.

In a document reading device, an opposing member may sometimes be disposed so as to be opposed to a document reading unit. At the time of cleaning the document reading unit, when the space between the image reading unit and the opposing member in a state where an opening and closing member, which is a covering of the document reading device, is open is the same as or smaller than that in a state where the opening and closing member is closed, it is difficult to clean the image reading unit.

Summary

Aspects of non-limiting embodiments of the present disclosure relate to obtaining an image reading device in which a reading unit may be more easily cleaned compared with the case where the space between the reading unit and an opposing member in a state where an opening and closing member is open is the same as or smaller than that in a state where the opening and closing member is closed.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image reading device including a housing that includes a transport path along which a document is transported, an opening and closing member that is attached to the housing in such a manner as to be openable and closable, a reading unit that is disposed in such a manner as to be positioned between the transport path and the opening and closing member and that reads an image from the document, which is transported along the transport path, and an opposing member that is disposed in such a manner as to be opposed to the reading unit with the transport path interposed between the opposing member and the reading unit and that is moved away from the reading unit in conjunction with an opening operation of the opening and closing member.

BRIEF DESCRIPTION OF THE DRAWINGS

An exemplary embodiment of the present disclosure will be described in detail based on the following figures, wherein.

DETAILED DESCRIPTION

Figure 1:
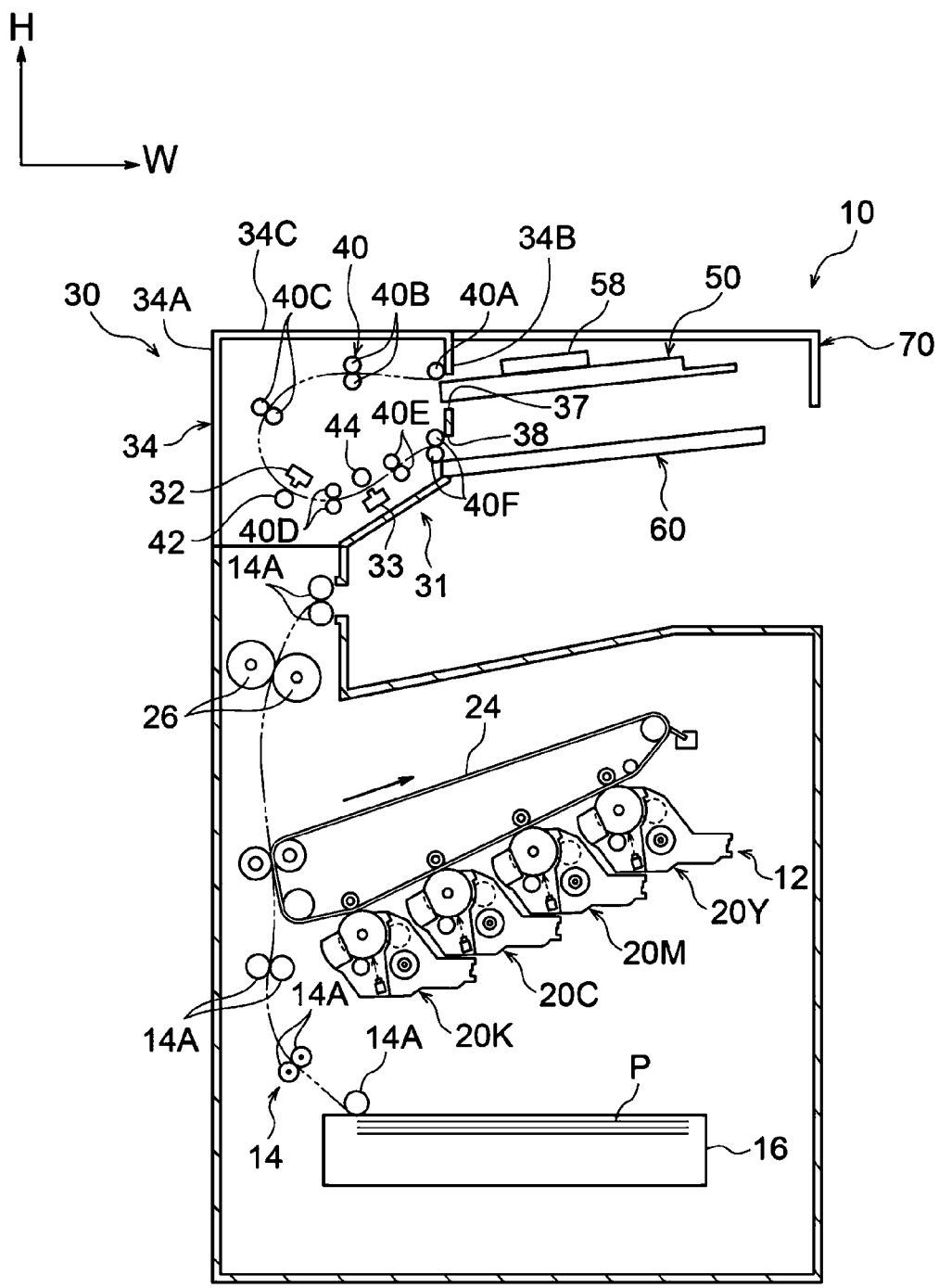
FIG. 1 is a schematic diagram illustrating an image reading device according to the present exemplary embodiment.

An example of image reading device according to an exemplary embodiment of the present disclosure and an example of image forming apparatus according to the exemplary embodiment of the present disclosure will be described with reference to FIG. 1 to FIG. 13. Note that arrow H, arrow W, and arrow D that are illustrated in the drawings respectively indicate a height direction of the image forming apparatus (specifically, the vertical direction) which will hereinafter be referred to as "apparatus height direction", a width direction of the image forming apparatus (specifically, a horizontal direction) which will hereinafter be referred to as "apparatus width direction", and a depth direction of the image forming apparatus (specifically, a horizontal direction) which will hereinafter be referred to as "apparatus depth direction". The apparatus height direction, the apparatus width direction, and the apparatus depth direction cross one another (specifically, they are perpendicular to one another).

In the apparatus width direction, a first side of the image forming apparatus 10 corresponds the left-hand side, and a second side of the image forming apparatus 10 corresponds the right-hand side. Accordingly, in the following description, the first side and the second side in the apparatus width direction will be referred to as the left-hand side and the right-hand side, respectively. These directions are defined for convenience of description, and thus, the configuration of the apparatus is not limited to these directions.

In the apparatus depth direction, a first side of the image forming apparatus 10 corresponds the front side, and a second side of the image forming apparatus 10 corresponds the rear side. Accordingly, in the following description, the first side and the second side in the apparatus width direction will be referred to as the front side and the rear side, respectively. These directions are defined for convenience of description, and thus, the configuration of the apparatus is not limited to these directions.

As illustrated in FIG. 1, the image forming apparatus 10 includes a transport unit 14, an image forming section 12, an image reading section 30, a transport mechanism 40, a document table 50, an ejection unit 60, and a document table 70. Note that the image reading section 30 in the present exemplary embodiment is an example of an image reading device.

As illustrated in FIG. 1, the transport unit 14 transports a recording medium P that is a sheet or the like accommodated in an accommodating unit 16. More specifically, the transport unit 14 includes a plurality of transport members 14A that are transport rollers or the like and transports the recording medium P by using the transport members 14A.

As illustrated in FIG. 1, the image forming section 12 forms an image onto the recording medium P, which is transported by the transport unit 14. The image forming section 12 is capable of forming an image that is read by the image reading section 30 onto the recording medium P.

Specifically, the image forming section 12 employs an electrophotographic system and forms a toner image (an example of an image) onto the recording medium P. More specifically, the image forming section 12 includes toner-image forming units 20Y, 20M, 20C, and 20K (hereinafter referred to as "toner-image forming units 20Y to 20K"), a transfer body 24, and a fixing unit 26.

In the image forming section 12, the toner-image forming units 20Y to 20K each perform charging, light exposure, development, and transfer processes so as to form toner images of yellow (Y), magenta (M), cyan (C), and black (K) onto the transfer body 24. In addition, in the image forming section 12, toner images of the different colors formed on the transfer body 24 are transferred onto the recording medium P, and these toner images are fixed onto the recording medium P by the fixing unit 26. As described above, the image forming section 12 employs an intermediate transfer system in which an image is transferred onto the recording medium P via the transfer body 24.

Figure 5:
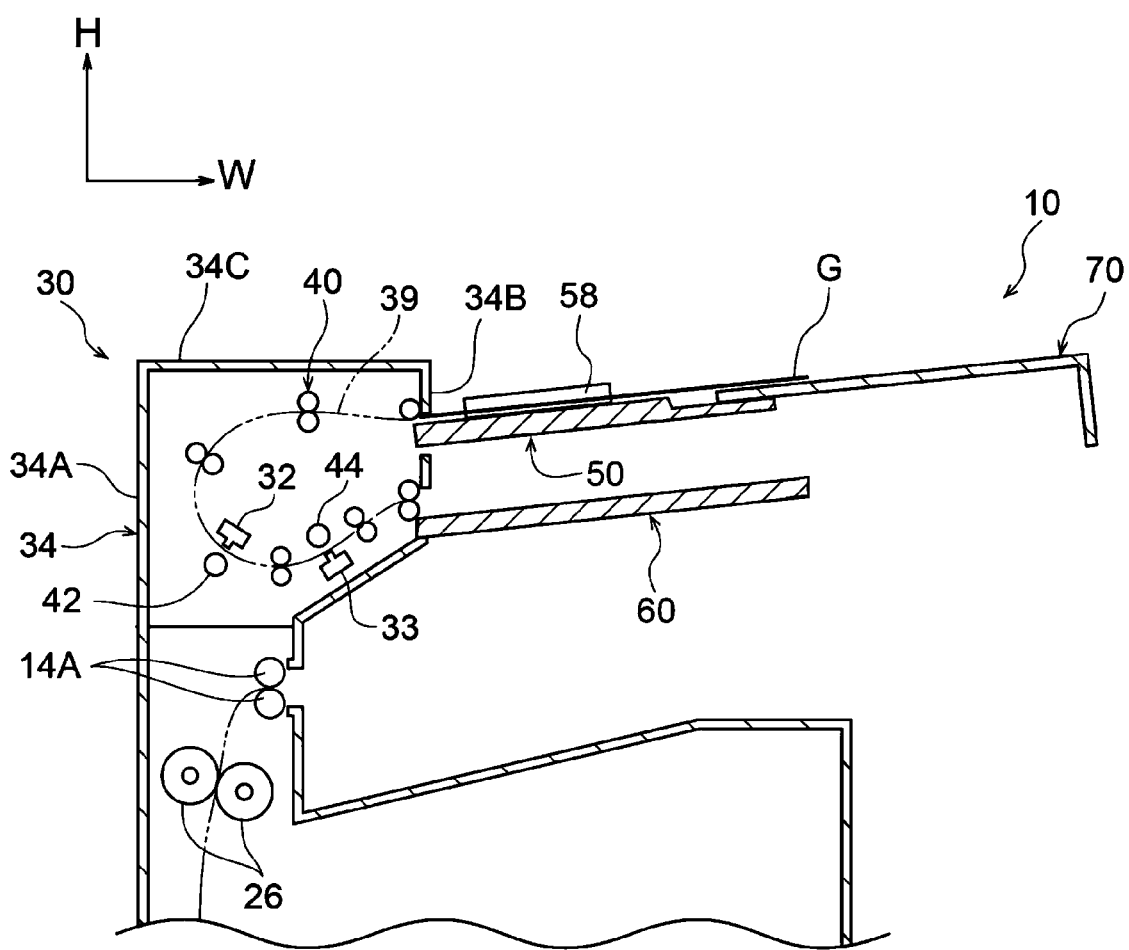
FIG. 5 is a sectional view illustrating a state where the document table has been moved to the exposing position in the configuration illustrated in FIG. 4.
Figure 6:
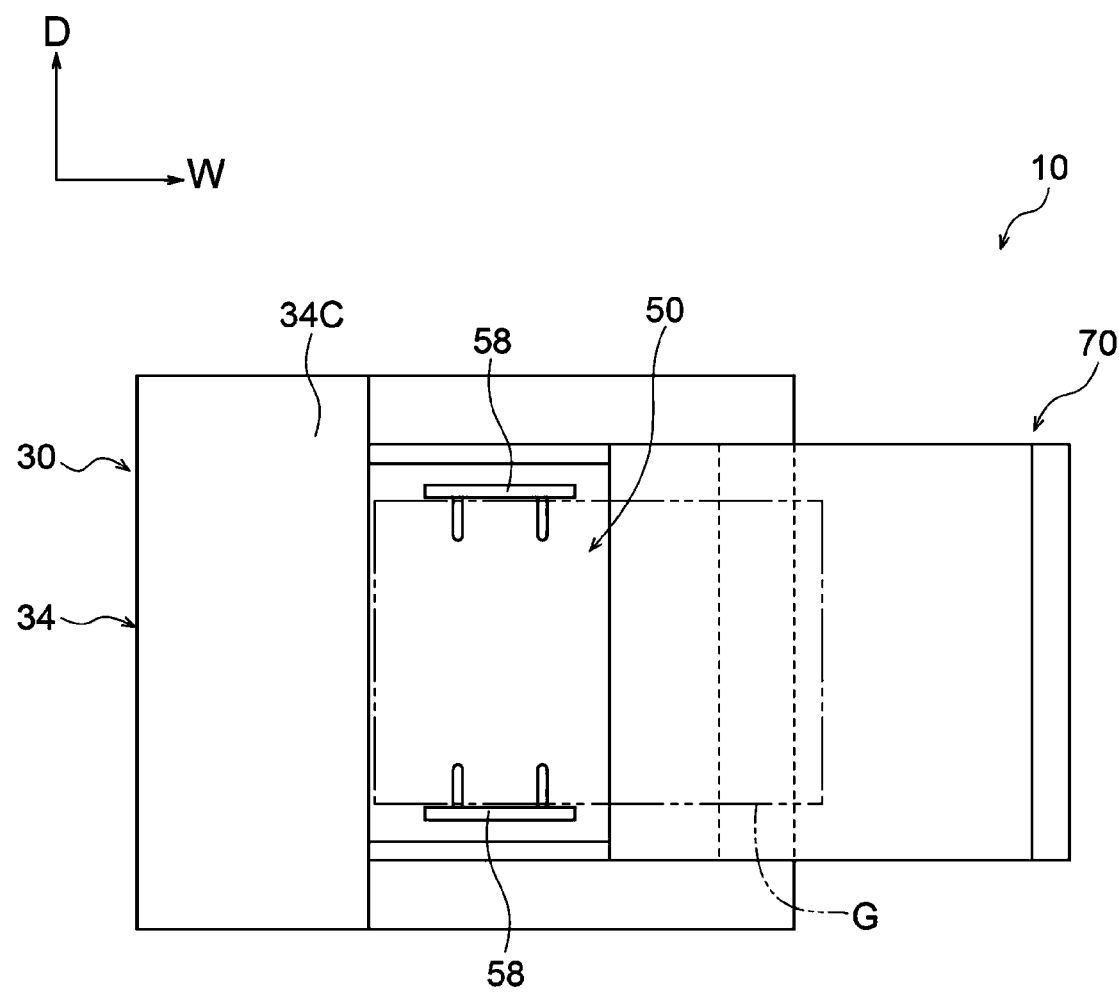
FIG. 6 is a plan view illustrating a state where the document table of the image forming apparatus according to the present exemplary embodiment has been moved to the exposing position.

As illustrated in FIG. 5 and FIG. 6, the image reading section 30 is a section that reads an image of a document G, which is transported. As illustrated in FIG. 1, the image reading section 30 is disposed above the image forming section 12. In other words, the image reading section 30 forms an upper portion of the image forming apparatus 10. More specifically, the image reading section 30 includes a housing 31, a reading sensor 32, a reading sensor 33, a covering 34, a chute 35, an opposing member 42, and an opposing member 44.

(Housing 31)

Figure 4:
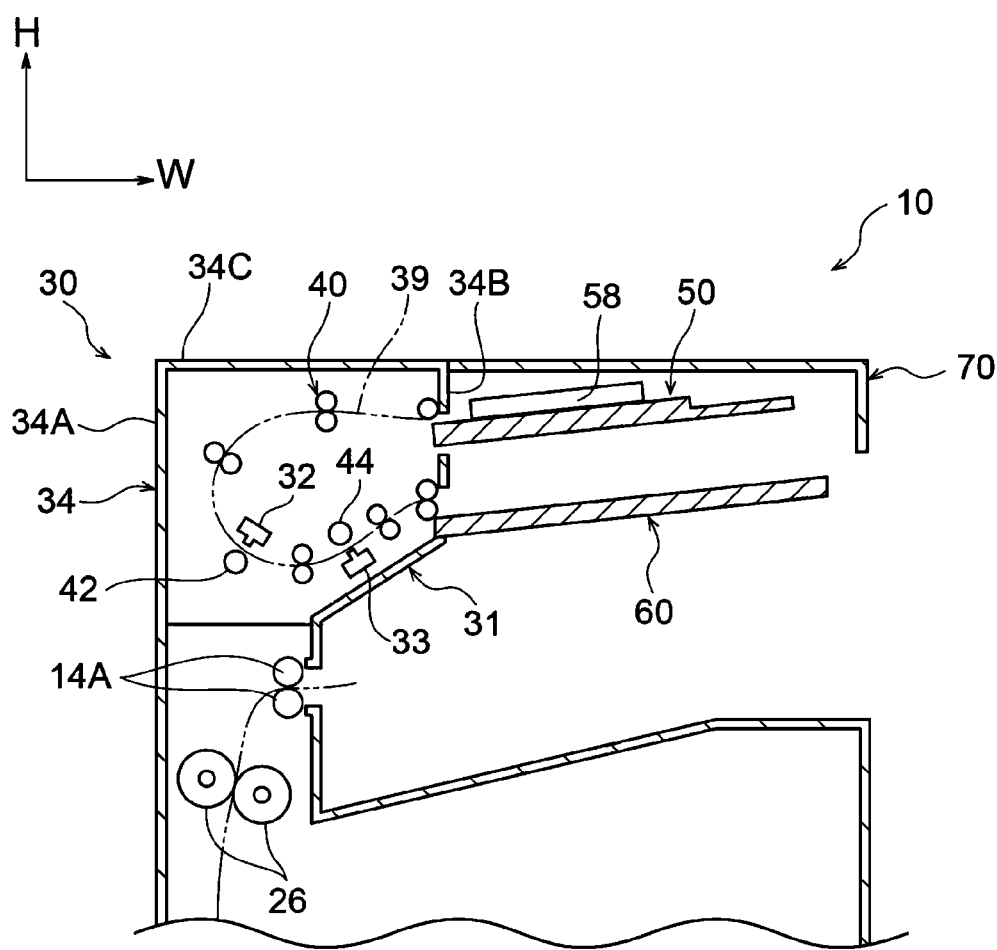
FIG. 4 is a sectional view illustrating an upper portion (the image reading device) of the image forming apparatus according to the present exemplary embodiment.

As illustrated in FIG. 1, FIG. 4, and FIG. 5, the housing 31 accommodates the chute 35, the reading sensor 32, and the reading sensor 33. In addition, the housing 31 accommodates a transport path 39 and the transport mechanism 40.

The transport path 39 is a path along which the document G placed on the document table 50 is transported from a receiving port 37 to an ejecting port 38 (i.e., the ejection unit 60). More specifically, the transport path 39 extends from the receiving port 37 toward a side plate 34A of the covering 34 (described later) on the left-hand side and is curved in an arc shape in such a manner as to extend to the ejecting port 38 on the right-hand side. For example, the transport path 39 has a C-like shape extending from the receiving port 37 to the ejecting port 38.

The transport mechanism 40 is a mechanism that transports the document G along the transport path 39. Specifically, the transport mechanism 40 includes a plurality of transport members that are transport rollers or the like. More specifically, the transport mechanism 40 includes transport members 40A, 40B, 40C, 40D, 40E, and 40F. The transport members 40A, 40B, 40C, 40D, 40E, and 40F are arranged in this order starting from an upstream side of the transport path 39.

(Reading Sensor 32)

The reading sensor 32 is a component that has a reading function for reading an image of one surface of the document G (e.g., the rear surface of the document G), which is transported. Note that the one surface of the document G is an example of a first surface of a document in the present disclosure. As an example, a contact image sensor (CIS) is used as the reading sensor 32.

As illustrated in FIG. 1, FIG. 4, and FIG. 5, the reading sensor 32 is disposed on the transport path 39. More specifically, the reading sensor 32 is disposed on the transport path 39 in such a manner as to be located on the side on which the side plate 34A of the covering 34 is present. In the present exemplary embodiment, as an example, the reading sensor 32 is positioned between the pair of transport members 40C and the pair of transport members 40D.

As illustrated in FIG. 4 and FIG. 5, the reading sensor 32 is oriented in a direction in which the covering 34 is opened. More specifically, the reading sensor 32 faces a side opening 31A of the housing 31 that is opened and closed by the covering 34 (see FIG. 11). In the present exemplary embodiment, as an example, the reading sensor 32 is oriented in an obliquely downward direction toward the left-hand side with respect to the housing 31. Note that the present disclosure is not limited to the above-described configuration, and the reading sensor 32 may face the left-hand side in the apparatus width direction or may be oriented in an obliquely upward direction toward the left-hand side with respect to the housing 31.

(Reading Sensor 33)

The reading sensor 33 is a component that has a reading function for reading an image of the other surface of the document G (e.g., the front surface of the document G), which is transported. Note that the other surface of the document G is an example of a second surface of the document in the present disclosure. As an example, a contact image sensor (CIS) is used as the reading sensor 33.

As illustrated in FIG. 1, FIG. 4, and FIG. 5, the reading sensor 33 is disposed on the transport path 39. More specifically, the reading sensor 33 is disposed on the transport path 39 in such a manner as to be located downstream from the reading sensor 32. In the present exemplary embodiment, as an example, the reading sensor 33 is positioned between the pair of transport members 40D and the pair of transport members 40E.

As illustrated in FIG. 4 and FIG. 5, the reading sensor 33 is oriented in the direction in which the covering 34 is opened. More specifically, the reading sensor 33 faces an upper opening 31C of the housing 31 that is opened and closed by the covering 34. In the present exemplary embodiment, as an example, the reading sensor 33 is oriented in an obliquely upward direction toward the left-hand side (see FIG. 11).

(Covering 34)

The covering 34 is a member that is attached to the housing 31 so as to be openable and closable. More specifically, the covering 34 is a member that opens and closes the side opening 31A, a side opening 31B, and the upper opening 31C of the housing 31, which are illustrated in FIG. 11, and is a member that allows an upstream portion of the transport path 39 to be exposed or covered. In a state where the covering 34 is open (the state illustrated in FIG. 10), the interior of the housing 31 is visible through the side openings 31A and 31B and the upper opening 31C. In other words, in the state where the covering 34 is open, the interior of the housing 31 is exposed to the outside. That is to say, the reading sensor 32 is exposed to the outside when the covering 34 is in an opened state.

On the other hand, in a state where the covering 34 is closed (the state illustrated in FIG. 9), the side openings 31A and 31B and the upper opening 31C are closed, and the interior of the housing 31 is not visible. In other words, in the state where the covering 34 is closed, the interior of the housing 31 is covered with the covering 34. That is to say, the reading sensor 32 is shielded from the outside by the covering 34 when the covering 34 is in a closed state. The covering 34 of the present exemplary embodiment is an example of a first opening and closing member of the present disclosure.

Figure 9:
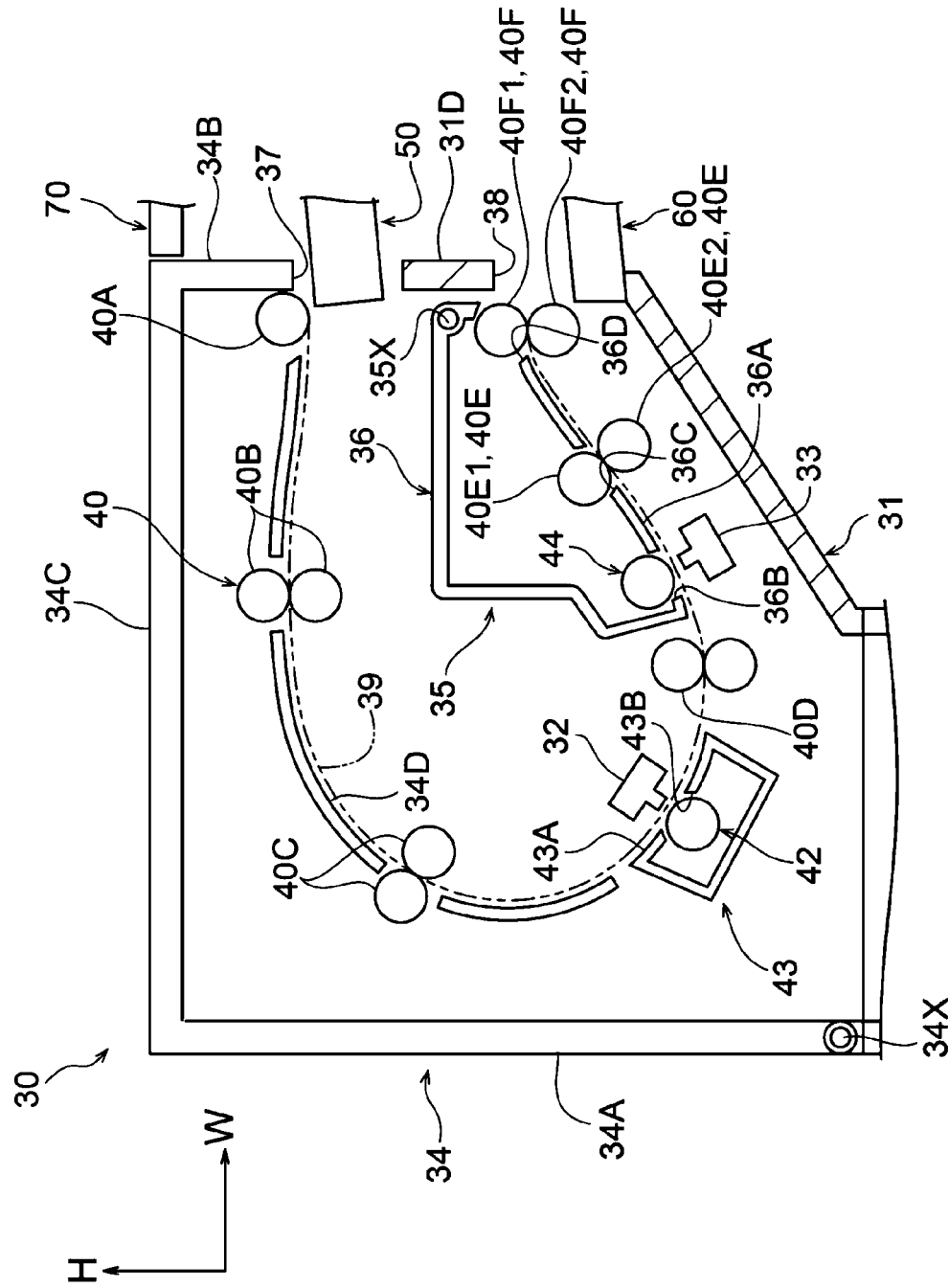
FIG. 9 is a schematic sectional view of an image reading section in a state where a first opening and closing member and a second opening and closing member are closed in the image forming apparatus according to the present exemplary embodiment.
Figure 10:
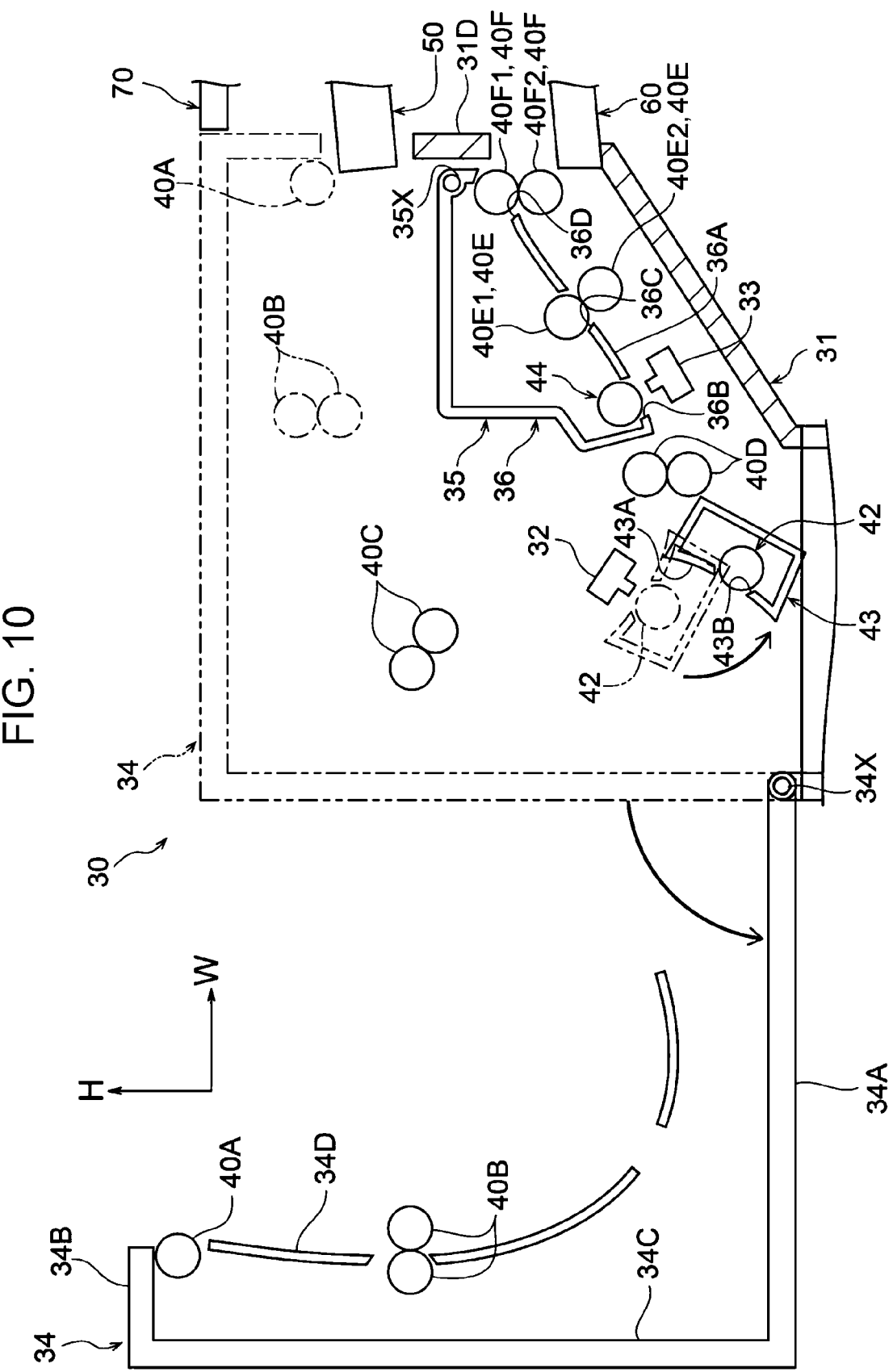
FIG. 10 is a schematic sectional view of the image reading section in a state where the first opening and closing member is open and where the second opening and closing member is closed in the image forming apparatus according to the present exemplary embodiment.
Figure 11:
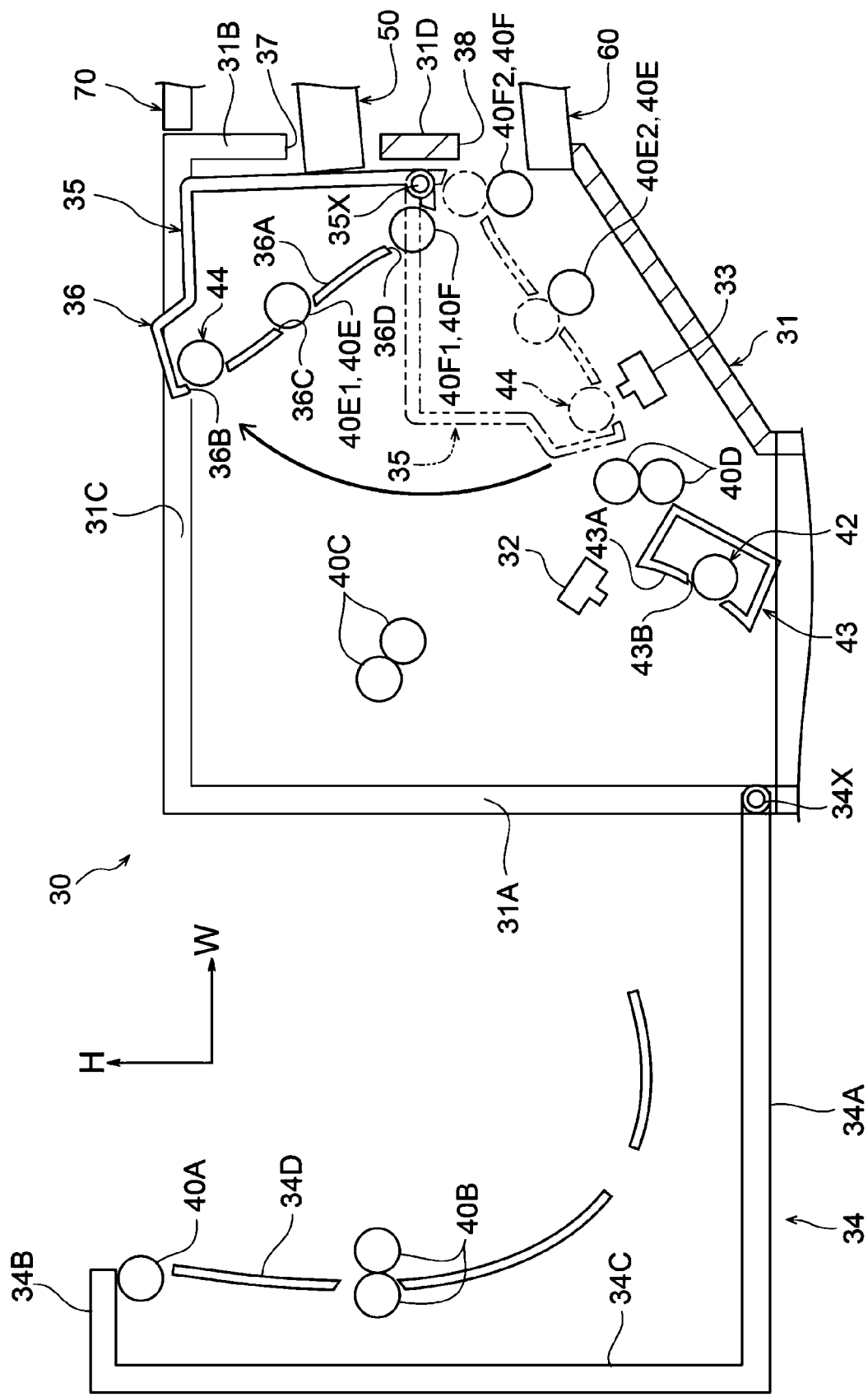
FIG. 11 is a schematic sectional view of the image reading section in a state where both the first opening and closing member and the second opening and closing member are open in the image forming apparatus according to the present exemplary embodiment.

As illustrated in FIG. 1, FIG. 9, and FIG. 10, the covering 34 includes a side plate 34A, a side plate 34B, and a top plate 34C.

The side plate 34A is a portion of the covering 34 that closes the side opening 31A of the housing 31. When the covering 34 is in the closed state, the side plate 34A is located on the left-hand side of the reading sensor 32 (see FIG. 1 and FIG. 9) and covers the reading sensor 32 from the left-hand side.

The side plate 34B is a portion of the covering 34 that closes the side opening 31B of the housing 31. When the covering 34 is in the closed state, the side plate 34B is located on the right-hand side of the reading sensor 32 (see FIG. 1 and FIG. 9) and covers the reading sensor 32 from the right-hand side.

The top plate 34C is a portion of the covering 34 that closes the upper opening 31C of the housing 31. When the covering 34 is in the closed state, the top plate 34C is located above the reading sensor 32 (see FIG. 1 and FIG. 9) and covers the reading sensor 32 from above.

The side plate 34B has the receiving port 37 through which the document G placed on the document table 50 enters the inside of the housing 31. The receiving port 37 is an opening extending in the apparatus depth direction.

The ejecting port 38 through which the document G is ejected to the ejection unit 60 from the inside of the housing 31 is formed below the receiving port 37 of the side plate 34B. More specifically, the ejecting port 38 is formed in a side wall 31D of the housing 31. The ejecting port 38 is an opening extending in the apparatus depth direction.

In addition, shaft portions 34X are provided at the two sides of a lower end portion of the covering 34 in the apparatus depth direction. Specifically, the pair of shaft portions 34X are arranged at a lower end portion of the side plate 34A. More specifically, one of the pair of shaft portions 34X projects frontward from the front surface of the side plate 34A in the apparatus depth direction, and the other of the pair of shaft portions 34X projects rearward from the rear surface of the side plate 34A in the apparatus depth direction. Each of the pair of shaft portions 34X is rotatably supported by a bearing portion (not illustrated) of the housing 31. Here, by causing the covering 34 to pivot about the pair of shaft portions 34X, the covering 34 opens and closes with respect to the housing 31.

As illustrated in FIG. 9, the covering 34 includes a chute portion 34D that forms a portion of the transport path 39. More specifically, the chute portion 34D is disposed inside the covering 34. The chute portion 34D forms a portion of the transport path 39, the portion being located upstream from the reading sensor 32. The chute portion 34D of the present exemplary embodiment is an example of a first transport-path component of the present disclosure.

The transport member 40A and the pair of transport members 40B, which are included in the above-mentioned transport mechanism 40, are arranged inside the covering 34. More specifically, the transport member 40A and the pair of transport members 40B are each rotatably supported by a bearing portion (not illustrated) provided inside the covering 34.

Here, in the state where the covering 34 is closed, the transport path 39 is formed in the housing 31. In addition, the plurality of transport members, which are included in the transport mechanism 40, are arranged at predetermined positions. Thus, the document G is smoothly transported along the transport path 39.

(Chute 35)

The chute 35 is a member that is attached to the housing 31 so as to be openable and closable. More specifically, the chute 35 is a member that is disposed in the housing 31 so as to cover and expose the transport path 39. In a state where the chute 35 is open (the state illustrated in FIG. 11), a portion that is used to be covered with the chute 35 is visible. In other words, the reading sensor 33 is exposed to the outside when the chute 35 is in an opened state.

On the other hand, in a state where the chute 35 is closed, the reading sensor 33 is covered with the chute 35. In other words, the reading sensor 33 is shielded from the outside by the chute 35 when the chute 35 is in a closed state.

The chute 35 of the present exemplary embodiment is an example of a second opening and closing member of the present disclosure.

The chute 35 includes a housing 36. The housing 36 has the shape of a box whose longitudinal direction is the same as the apparatus depth direction. Shaft portions 35X are provided at the two sides of the housing 36 in the apparatus depth direction. Specifically, the shaft portions 35X are each arranged at an upper right corner of the housing 36. More specifically, one of the shaft portions 35X projects frontward from the front surface of the housing 36 in the apparatus depth direction, and the other of the shaft portions 35X projects rearward from the rear surface of the housing 36 in the apparatus depth direction. Each of the pair of shaft portions 35X is rotatably supported by a bearing portion (not illustrated) of the housing 31. Here, by causing the chute 35 to pivot about the pair of shaft portions 35X, the chute 35 opens and closes with respect to the housing 31.

In addition, a bottom-plate portion 36A that is a lower portion of the housing 36 has a plurality of openings 36B, 36C, and 36D that are formed so as to be spaced apart from one another and so as to be arranged in a direction from the upstream toward the downstream of the transport path 39. The opposing member 44, which is disposed in the housing 36, is opposed to the reading sensor 33 through the opening 36B.

As illustrated in FIG. 9, the bottom-plate portion 36A of the chute 35 forms a portion of the transport path 39. More specifically, the bottom-plate portion 36A forms a portion of the transport path 39, the portion being located downstream from the reading sensor 32. The bottom-plate portion 36A of the present exemplary embodiment is an example of a second transport-path component of the present disclosure.

The transport members 40E and 40F, which are included in the above-mentioned transport mechanism 40, and the opposing member 44 are arranged in the housing 36. More specifically, a transport member 40E1 that is one of the pair of transport members 40E and that is located further toward the upper side than the other and a transport member 40F1 that is one of the pair of transport members 40F and that is located further toward the upper side than the other are attached to the inside of the housing 36. Each of these transport members 40E1 and 40F1 is rotatably supported by a bearing portion (not illustrated) provided in the housing 36. In addition, a portion of the outer peripheral surface of the transport member 40E1 projects from the opening 36C of the housing 36. Furthermore, a portion of the outer peripheral surface of the transport member 40F1 projects from the opening 36D of the housing 36.

As illustrated in FIG. 9, the chute 35 is covered with the covering 34. Thus, even when the covering 34 is in the opened state (see FIG. 10), the reading sensor 33 is shielded from the outside by the chute 35 as long as the chute 35 is in the closed state.

(Opposing member 42)

As illustrated in FIG. 9, the opposing member 42 is disposed so as to be opposed to the reading sensor 32 with the transport path 39 interposed therebetween. More specifically, the opposing member 42 has the shape of a roller and is disposed such that the axial direction thereof is the same as the apparatus depth direction. The opposing member 42 is, for example, a color reference member for shading correction. In the present exemplary embodiment, as an example, the outer peripheral surface of the opposing member 42 serves as a white reference surface.

As illustrated in FIG. 10, the opposing member 42 is moved away from the reading sensor 32 in conjunction with an opening operation of the covering 34. More specifically, the opposing member 42 is moved by link mechanisms 46 in conjunction with the opening operation of the covering 34 in such a manner that the gap between the counter member 42 and the reading sensor 32 increases. Here, the position of the opposing member 42 when the opposing member 42 is opposed to the reading sensor 32 in a state where the covering 34 is closed will hereinafter be referred to as an opposed position of the opposing member 42 (see FIG. 9). In addition, the position of the opposing member 42 when the opposing member 42 is spaced apart from the reading sensor 32 in a state where the covering 34 is open will hereinafter be referred to as a separated position of the opposing member 42 (see FIG. 10 and FIG. 11).

As illustrated in FIG. 9, the opposing member 42 is accommodated in a housing 43. The housing 43 has the shape of a box, and an opening 43B is formed in a top-plate portion 43A of the housing 43. The opposing member 42 is opposed to the reading sensor 32 through the opening 43B.

(Opposing member 44)

As illustrated in FIG. 9, the opposing member 44 is disposed so as to be opposed to the reading sensor 33 with the transport path 39 interposed therebetween. More specifically, the opposing member 44 has the shape of a roller and is disposed such that the axial direction thereof is the same as the apparatus depth direction. The opposing member 44 is, for example, a color reference member for shading correction. In the present exemplary embodiment, as an example, the outer peripheral surface of the opposing member 44 serves as a white reference surface.

As illustrated in FIG. 10, the opposing member 44 is moved away from the reading sensor 33 in conjunction with an opening operation of the chute 35. More specifically, the opposing member 44 is moved in conjunction with the opening operation of the chute 35 in such a manner that the gap between the counter member 44 and the reading sensor 33 increases. Here, the position of the opposing member 447 when the opposing member 44 is opposed to the reading sensor 33 in a state where the chute 35 is closed (see FIG. 9 and FIG. 10) will hereinafter be referred to as an opposed position of the opposing member 44 (see FIG. 9 and FIG. 10). In addition, the position of the opposing member 44 when the opposing member 44 is spaced apart from the reading sensor 33 in a state where the chute 35 is open will hereinafter be referred to as a separated position of the opposing member 44 (see FIG. 11).

As illustrated in FIG. 9, the opposing member 44 is accommodated in the housing 36 of the chute 35. The opposing member 44 is opposed to the reading sensor 33 through the opening 36B of the housing 36. In addition, the opposing member 44 is attached to the housing 36 and moved along with pivotal movement of the housing 36.

(Link Mechanism 46)

Figure 12:
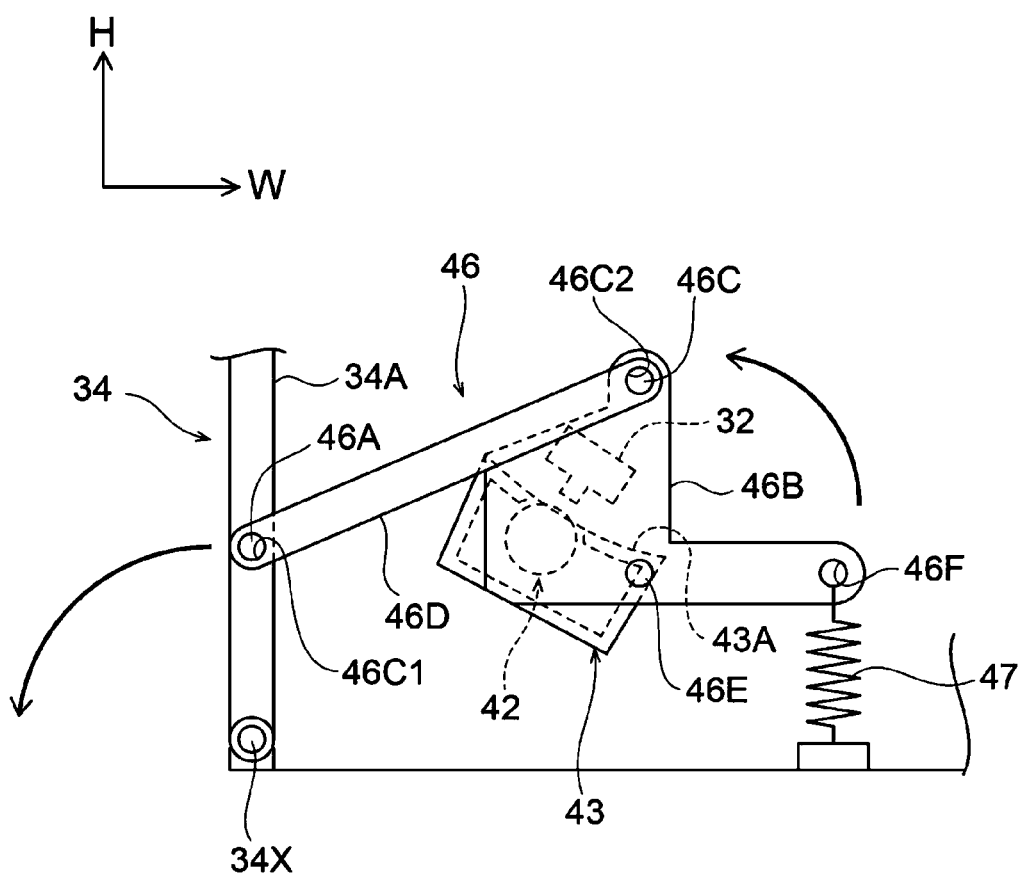
FIG. 12 is a side view illustrating a state of a link mechanism in the state illustrated in FIG. 10.
Figure 13:
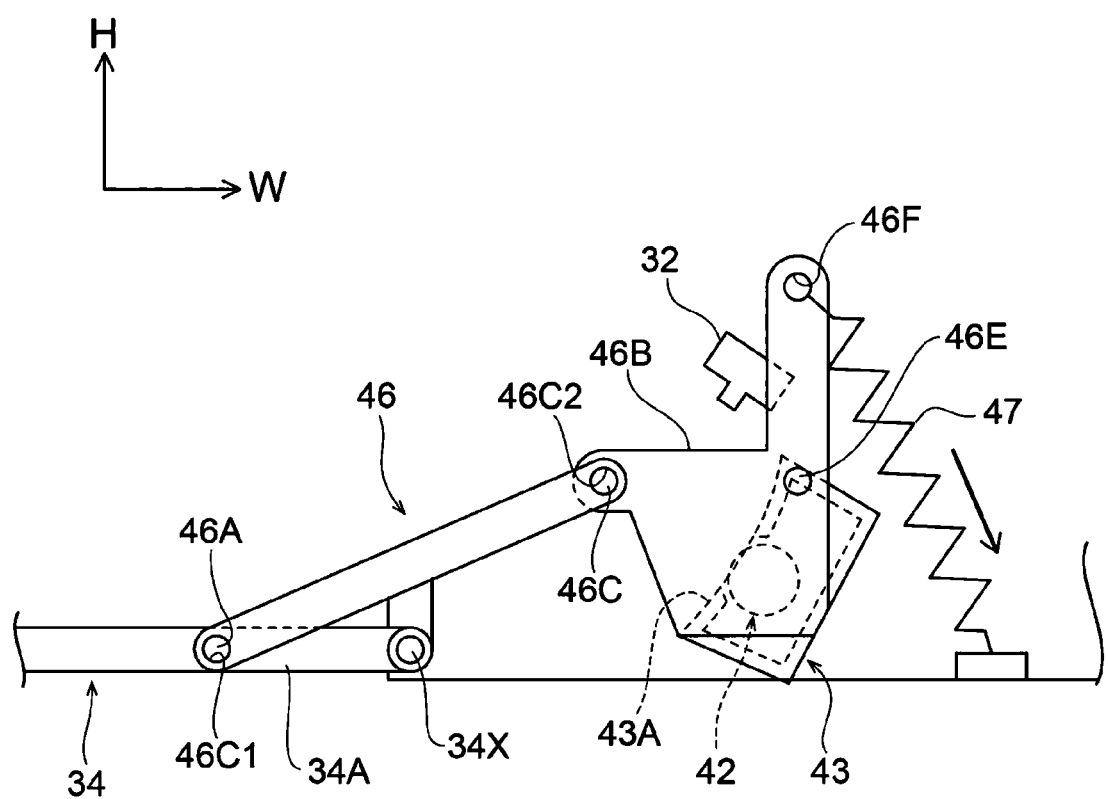
FIG. 13 is a side view illustrating a state of the link mechanism in the state illustrated in FIG. 11.

As illustrated in FIG. 12 and FIG. 13, the link mechanisms 46 are mechanisms that move the opposing member 42 away from the reading sensor 32 in conjunction with the opening operation of the covering 34. The link mechanism 46 illustrated in FIG. 12 and FIG. 13 includes one of the shaft portions 34X of the covering 34, the side plate 34B of the covering 34, a pin 46A that is attached to the side plate 34B, a link 46B that is attached to a side surface of the housing 43, a pin 46C that is attached to the link 46B, a link 46D that connects the pin 46A and the pin 46C to each other, and a shaft portion 46E that is attached to the link 46B. Note that the link mechanisms 46 are provided on the two sides in the apparatus depth direction, and the link mechanism 46 on the front side will be described below as a representative example.

The pin 46A is a projection projecting forward from a front surface of the side plate 34A. The pin 46A is disposed so as to be located above the shaft portion 34X in the state where the covering 34 is closed. In addition, the pin 46A is rotatably fitted in a connection hole 46C1 that is formed in one end portion of the link 46B in the longitudinal direction of the link 46B.

The link 46B is a plate member that is fixed to the side surface of the housing 43. In the state where the covering 34 is closed, the pin 46C is located above the link 46B, and the shaft portion 46E is located below the pin 46C. The link 46B has an attachment hole 46F that is formed so as to be located on the right-hand side of the shaft portion 46E. A second end of a spring member 47 whose first end is fixed to the housing 31 is fitted in the attachment hole 46F. Here, in the present exemplary embodiment, a coil spring is used as an example of the spring member 47.

The pin 46C is a projection projecting forward from a front surface of the link 46B. The pin 46C is rotatably fitted in a connection hole 46C2 that is formed in the other end portion of the link 46B in the longitudinal direction.

The link 46D is a plate member and connects the pin 46A and the pin 46C to each other.

The shaft portion 46E projects forward from the front surface of the link 46B and is rotatably supported by a bearing portion (not illustrated) of the housing 31.

As illustrated in FIG. 13, in the link mechanism 46, when the covering 34 is opened, the link 46B connected to the link 46D pivots about the shaft portion 46E along with rotation of the pin 46A. This pivotal movement of the link 46B causes the housing 43 of the opposing member 42 to move away from the position where the opposing member 42 is opposed to the reading sensor 32. In other words, the opposing member 42 is moved from the opposed position to the separated position.

In a state where the covering 34 is open, as illustrated in FIG. 13, the spring member 47 is stretched along with the pivotal movement of the link 46B. In other words, in a state where the covering 34 is open, a force that causes the link 46B to return to the original pivotal position (here, a pivotal position when the opposing member 42 is at the opposed position) is applied by the spring member 47 to the link 46B. Thus, when the covering 34 is closed, the link 46B returns to the original pivotal position, and the opposing member 42 is moved from the separated position to the opposed position, where the opposing member 42 is opposed to the reading sensor 32.

Figure 3:
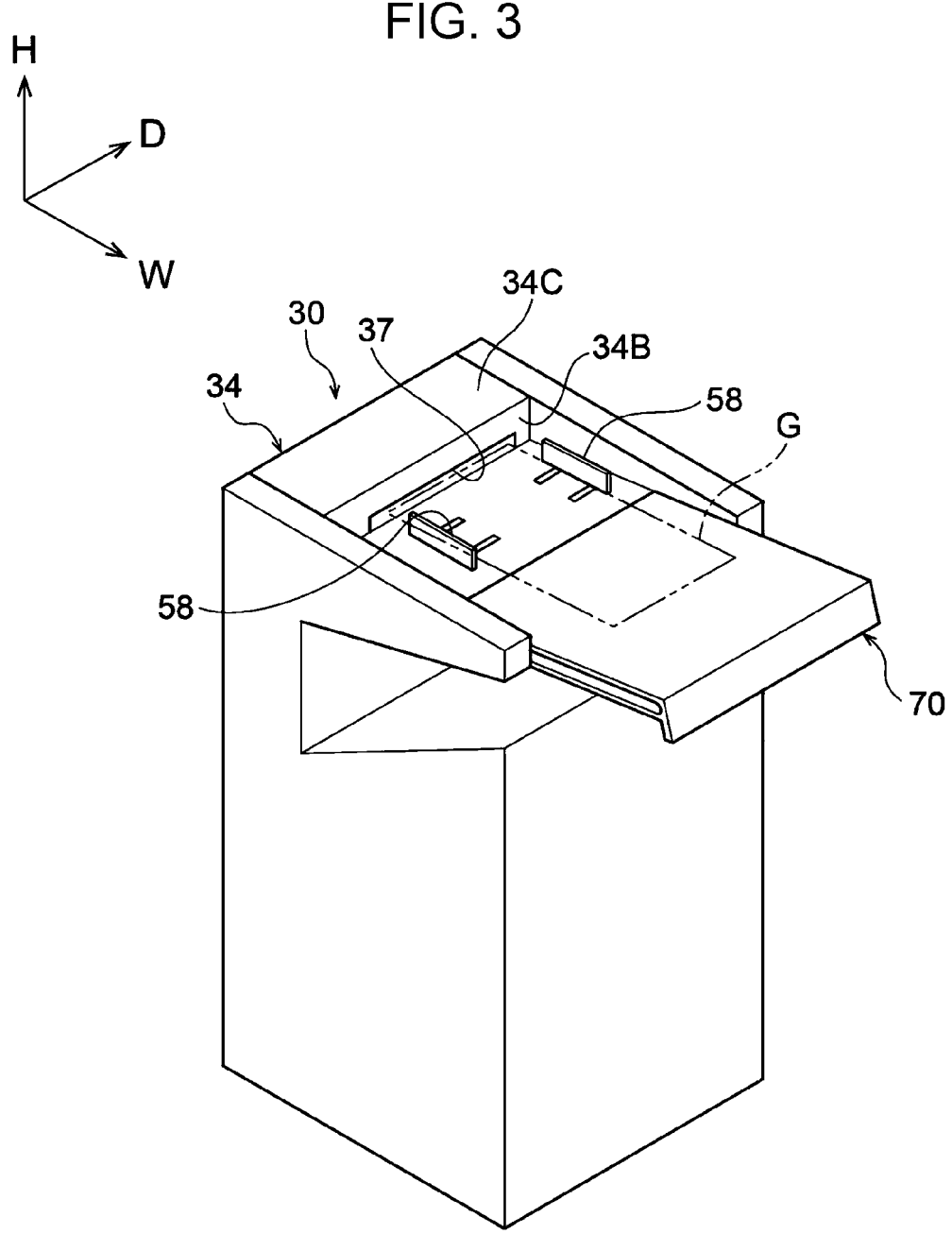
FIG. 3 is a perspective view illustrating a state where a document table has been moved to an exposing position in the configuration illustrated in FIG. 2.

As illustrated in FIG. 3 and FIG. 5, the document table 50 is a table on which the document G whose image is to be read by the image reading section 30 (see FIG. 1) is placed. In other words, the document table 50 is a portion on which the document G that is transported by the transport mechanism 40 (see FIG. 1) is placed.

In the present exemplary embodiment, as will be described later, the document G is placed onto the document table 50 from above in a state where the document table 70 is located at an exposing position.

Note that, in the present exemplary embodiment, the term "document table" refers to a component on which the document G may be placed. Thus, the term "table" is not intended to be limited to a particular shape.

As illustrated in FIG. 1, the document table 50 is disposed on the right-hand side of the image reading section 30. In addition, the document table 50 is disposed below the document table 70.

The document table 50 is formed in a plate-like shape extending rightward from the side plate 34B of the covering 34. The top surface of the document table 50 extends rightward from the receiving port 37. This top surface is an inclined surface that is inclined upward from the receiving port 37 to the right-hand side.

Figure 7:
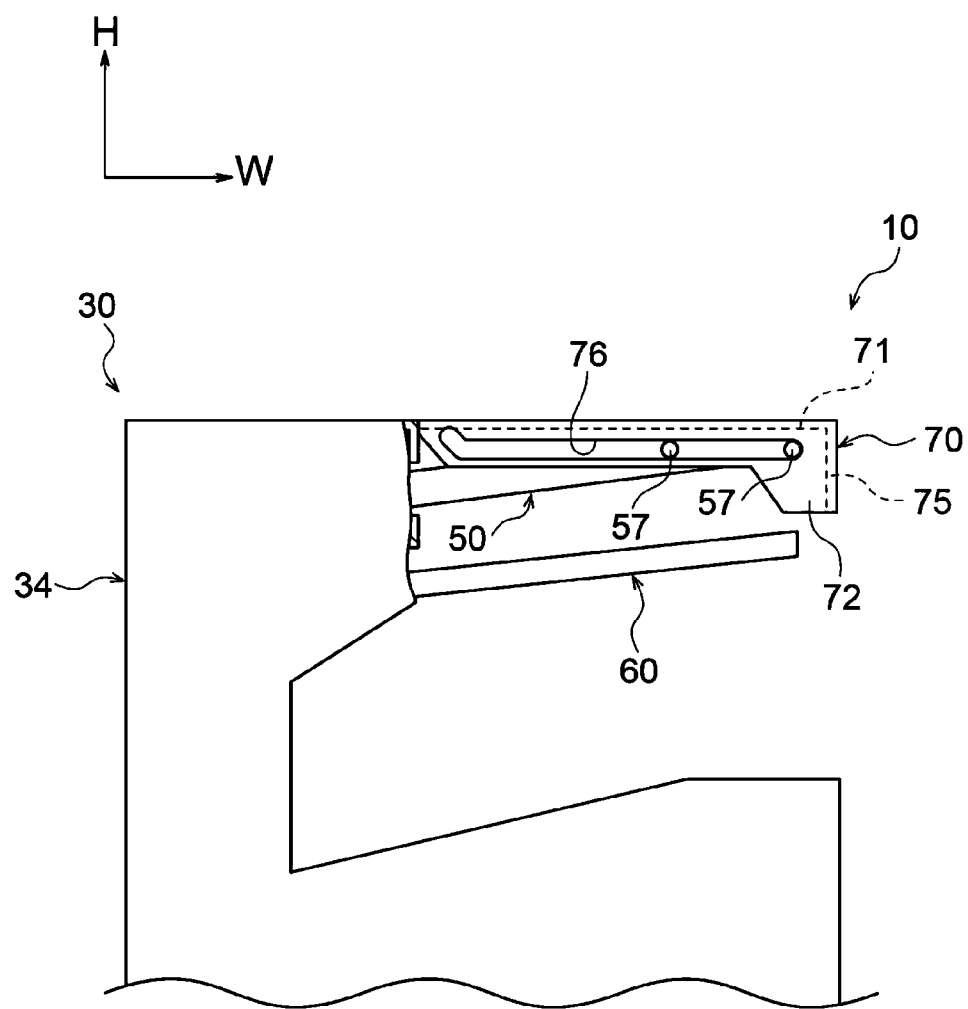
FIG. 7 is a sectional view illustrating a moving mechanism that is included in the image forming apparatus according to the present exemplary embodiment.

As illustrated in FIG. 3 and FIG. 7, the document table 50 is provided with restraining members 58 (so-called side guides). The restraining members 58 are brought into contact with side edges of the document G placed on the document table 50 so as to restrain the document G from moving toward one side and the other side in the apparatus depth direction.

The ejection unit 60 illustrated in FIG. 5 is a portion to which the document G whose image has been read by the image reading section 30 is ejected. In other words, it may be said that the ejection unit 60 is a portion onto which the document G transported by the transport mechanism 40 is placed.

The ejection unit 60 is positioned below the top plate 34C and below the document table 50. The ejection unit 60 is formed in a plate-like shape extending rightward from the side plate 334B of the covering 34.

Figure 2:
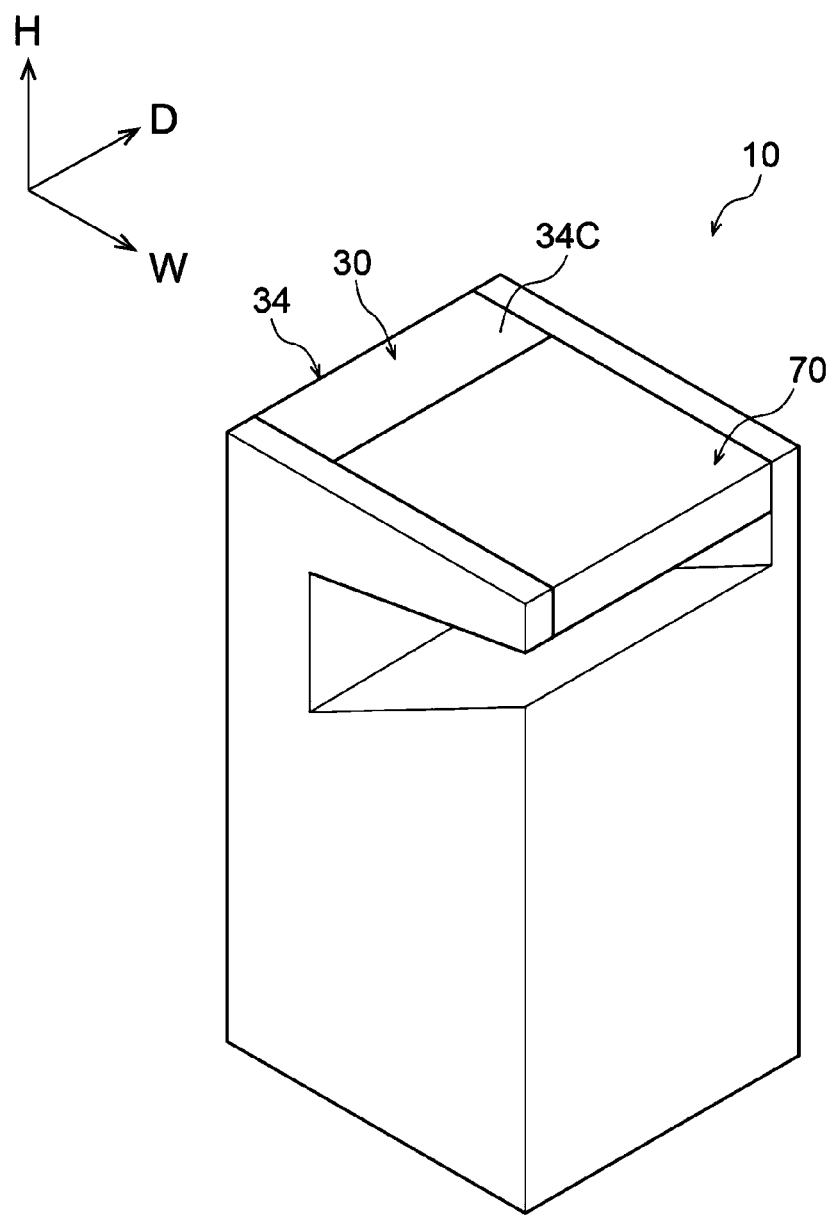
FIG. 2 is a perspective view illustrating an image forming apparatus according to the present exemplary embodiment.

As illustrated in FIG. 2 and FIG. 4, the document table 70 is a table onto which the document G is placed. The document table 70 is positioned above the ejection unit 60 and above the document table 50. Thus, the document table 70 covers the document table 50 from above.

More specifically, the document table 70 includes a top plate 71, side plates 72, 74, and 75 as illustrated in FIG. 3. As illustrated in FIG. 4, the top plate 71 has a plate-like shape whose plate-thickness direction is the same as the vertical direction and has a substantially rectangular shape in plan view as illustrated in FIG. 6.

The side plate 75 projects downward from a right-hand end portion of the top plate 71. The side plate 75 is formed in a plate-like shape whose plate-thickness direction is the same as the apparatus width direction. The side plate 75 is located on the right-hand side of the document table 50 and covers the document table 50 from the right-hand side.

The side plates 72 and 74 project downward from a front end portion and a rear end portion of the top plate 71, respectively (see FIG. 3). The side plates 72 and 74 are each formed in a plate-like shape whose plate-thickness direction is the same as the apparatus depth direction. The side plates 72 and 74 are respectively arranged in front of and to the rear of the document table 50 and cover the document table 50 from the front side and the rear side, respectively.

The document table 70 is movable between a covering position at which the document table 70 covers the document table 50 from above (the position illustrated in FIG. 1, FIG. 2, and FIG. 4) and an exposing position at which the document table 70 exposes the upper side of the document table 50 (the position illustrated in FIG. 3 and FIG. 5). In the present exemplary embodiment, the document table 70 is supported by the housing 31 so as to be movable between the covering position and the exposing position.

Figure 8:
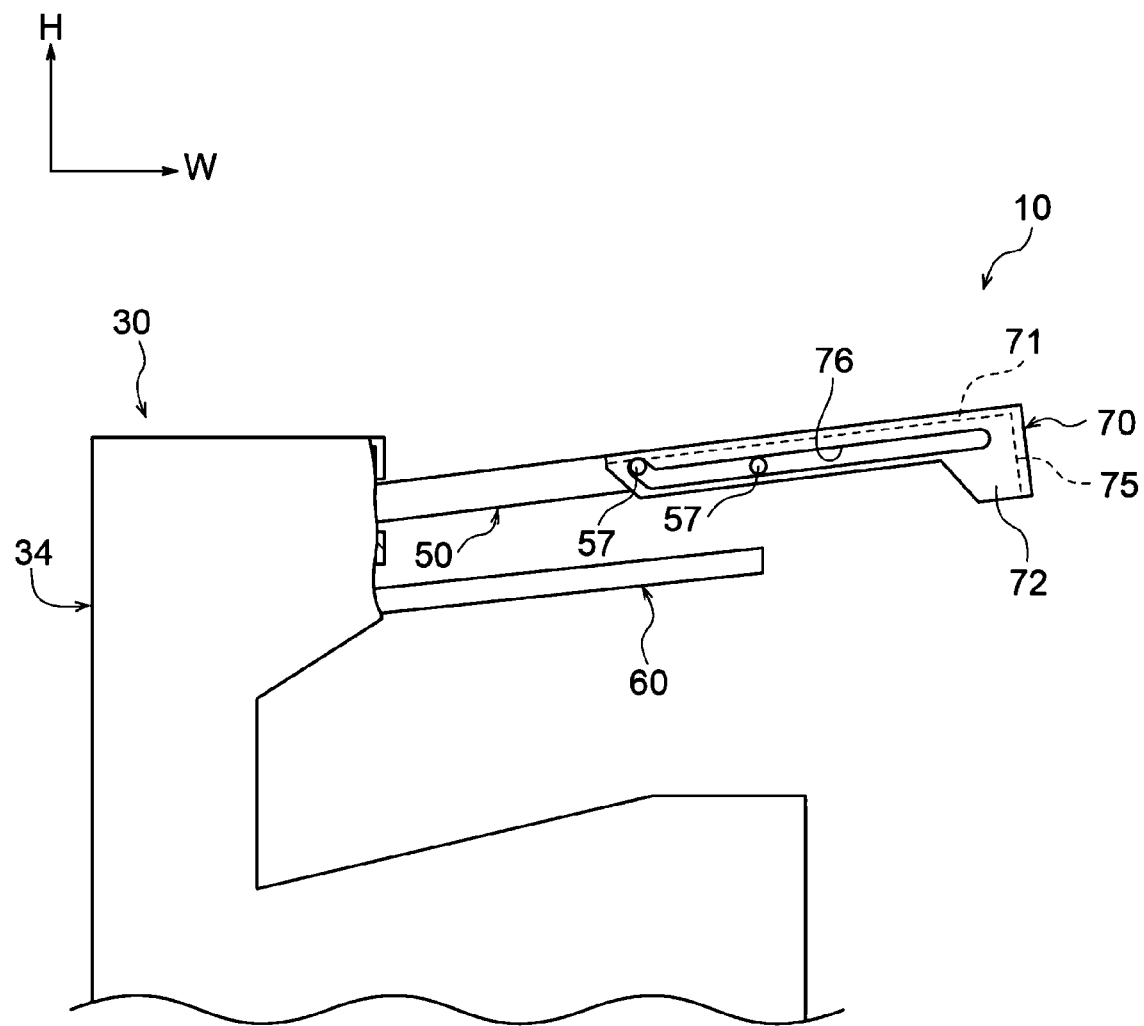
FIG. 8 is a sectional view illustrating a state where the document table has been moved to the exposing position in the configuration illustrated in FIG. 7.

As illustrated in FIG. 7 and FIG. 8, a rail 76, which is formed of a hole elongated in a transverse direction, is formed in each of the side plates 72 and 74. Shaft portions 57 and 59 that are attached to the front surface and the rear surface of the document table 50, respectively, are each inserted in one of the rails 76. The shaft portions 57 and 59 guide the document table 70 to the covering position (the position illustrated in FIG. 7) and the exposing position (the position illustrated in FIG. 8) along the rails 76, so that the document table 70 moves in the apparatus width direction between the covering position (the position illustrated in FIG. 7) and the exposing position (the position illustrated in FIG. 8).

As illustrated in FIG. 3 and FIG. 5, when the document table 70 is located at the exposing position, the document table 50 is located on the side opposite to the side on which the image reading section 30 is present with respect to the document table 50 (i.e., the document table 50 is located on the right-hand side). In addition, the document G that is placed on the document table 50 is partially placed on the document table 70 located at the exposing position.

As described above, in the image forming apparatus 10, a moving mechanism that moves the document table 70 is formed of the shaft portions 57 and 59 and the rails 76. Note that the moving mechanism is not limited to having the above-described configuration and may be formed of various machine elements.

As described above, the document table 70 has a function of serving as a covering that covers the document table 50. In other words, the document table 70 also serves as a covering that covers the document table 50.

(Operations according to Present Exemplary Embodiment)

In the image reading section 30 of the present exemplary embodiment, when the covering 34 is opened, the opposing member 42 is moved away from the reading sensor 32 in conjunction with the opening operation of the covering 34. Thus, in the image reading section 30, cleaning of the reading sensor 32 may be more easily performed compared with the configuration in which the gap between the reading sensor 32 and the opposing member 42 when the covering 34 is in the opened state is smaller than or the same as that when the covering 34 is in the closed state. In addition, in the image reading section 30, cleaning of the reading sensor 32 may be more easily performed compared with the configuration in which the opposing member 42 is moved away from the reading sensor 32 by an operator after the covering 34 has been opened.

In the image reading section 30, when the chute 35 is opened, the opposing member 44 is moved away from the reading sensor 33 in conjunction with the opening operation of the chute 35. Thus, in the image reading section 30, cleaning of the reading sensor 33 may be more easily performed compared with the configuration in which the gap between the reading sensor 33 and the opposing member 44 when the chute 35 is in the opened state is smaller than or the same as that when the chute 35 is in the closed state. In addition, in the image reading section 30, cleaning of the reading sensor 33 may be more easily performed compared with the configuration in which the opposing member 44 is moved away from the reading sensor 33 by an operator after the chute 35 has been opened.

In addition, in the image reading section 30, the reading sensor 32 is exposed when the covering 34 is in the opened state, and the reading sensor 33 is exposed when the chute 35 is in the opened state. Thus, in the image reading section 30, cleaning of the reading sensor 32 and the reading sensor 33 may be more easily performed compared with the configuration in which the reading sensor 32 and the reading sensor 33 are covered when the covering 34 and the chute 35 are both in the opened state.

In the image reading section 30, when the covering 34 is in the opened state and the chute 35 is in the closed state, the reading sensor 33 is covered.

In the image reading section 30, the link mechanisms 46 move the opposing member 42 away from the reading sensor 32 in conjunction with the opening operation of the covering 34.

In the image reading section 30, the reading sensor 32 is oriented in the direction in which the covering 34 is opened. Thus, in the image reading section 30, cleaning of the reading sensor 32 may be more easily performed compared with the configuration in which the reading sensor 32 is oriented in a direction opposite to the direction in which the covering 34 is opened. Note that the situation in which the reading sensor 32 is oriented in the direction in which the covering 34 is opened may be rephrased as "the transport path 39 for the recording medium P is located further toward the outside of the image forming apparatus 10 than the reading sensor 32 is". Here, in the image reading section 30, cleaning of the reading sensor 32 may be more easily performed compared with the configuration in which the transport path 39 is located further toward the inside of the image forming apparatus 10 than the reading sensor 32 is.

In the image reading section 30, the reading sensor 33 is oriented in the direction in which the chute 35 is opened. Thus, in the image reading section 30, cleaning of the reading sensor 33 may be more easily performed compared with the configuration in which the reading sensor 33 is oriented in a direction opposite to the direction in which the chute 35 is opened.

In the image reading section 30, the covering 34 includes the chute portion 34D that forms a portion of the transport path 39, the portion being located upstream from the reading sensor 32. Thus, in the image reading section 30, the transport path 39 is exposed by opening the covering 34, and the upstream portion of the transport path 39 may be accessible.

In the image reading section 30, the chute 35 includes the bottom-plate portion 36A that forms a portion of the transport path 39, the portion being located downstream from the reading sensor 32. Thus, in the image reading section 30, the transport path 39 is exposed by opening the chute 35, and the downstream portion of the transport path 39 may be accessible.

In the image reading section 30, the chute 35 is covered with the covering 34.

According to the image forming apparatus 10, an image read by the image reading section 30 may be formed onto the recording medium P by the image forming section 12.

(Modification of Image Forming Section 12)

In the image forming apparatus 10, although the image forming section 12 is used as an example of an image forming unit of the present disclosure, the image forming unit of the present disclosure is not limited to the image forming section 12. As an example of the image forming unit of the present disclosure, a direct transfer system in which the toner-image forming units 20Y to 20K form toner images directly onto the recording medium P without using the transfer body 24 may be used. Another example of the image forming unit of the present disclosure may be an image forming unit that forms an image by discharging an ink onto the recording medium P. In other words, the image forming unit of the present disclosure is not particularly limited as long as it has a function of forming an image onto the recording medium P.

(Modification of Image Reading Section 30)

In the image reading section 30, although a contact image sensor is used as an example of a reading unit of the present disclosure, the reading unit of the present disclosure is not limited to a contact image sensor. For example, an image sensor such as a charge coupled device (CCD) may be used as the reading unit. In other words, the reading unit of the present disclosure is not particularly limited as long as it is capable of reading an image.

Although the image reading section 30 of the present exemplary embodiment includes the reading sensors 32 and 33, the image reading section 30 is not limited to having this configuration. The image reading section 30 may include only one of the reading sensors 32 and 33. In other words, the image reading section 30 may be capable of reading an image on at least one surface of the document G.

s(Other Modifications)

Figure 14:
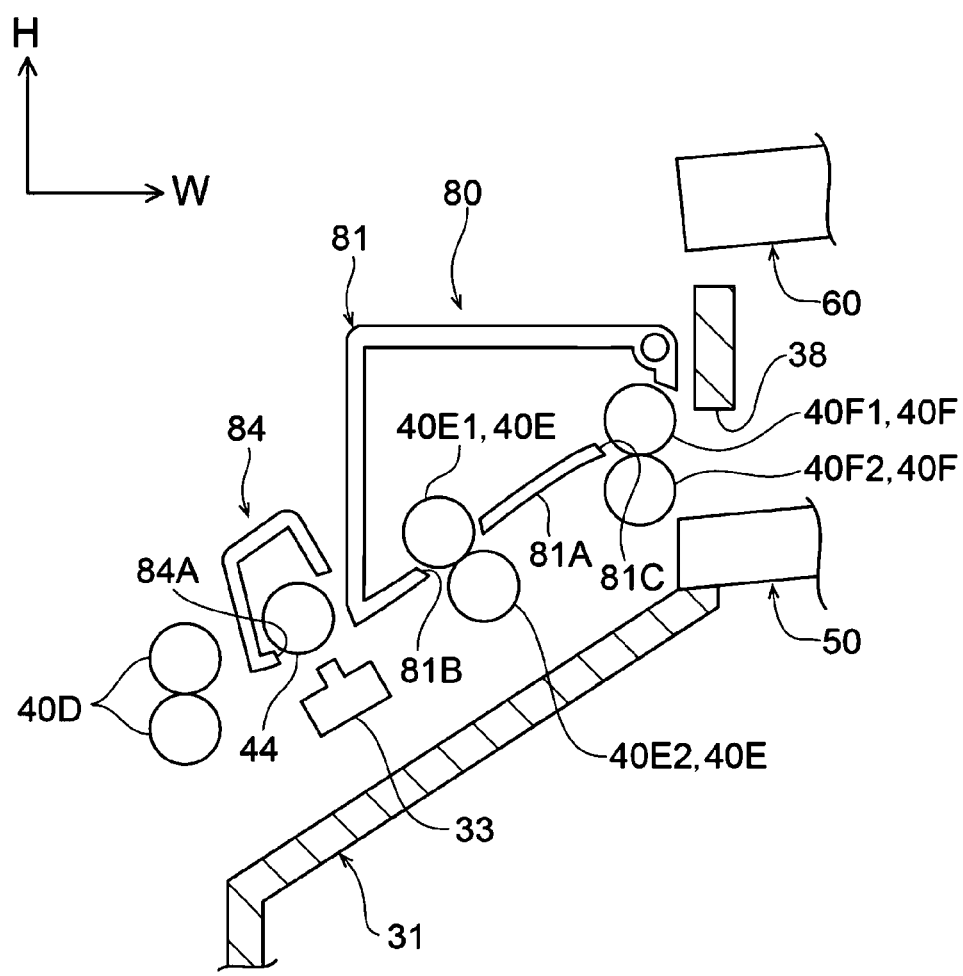
FIG. 14 is a side view illustrating a modification of the second opening and closing member according to the present exemplary embodiment.
Figure 15:
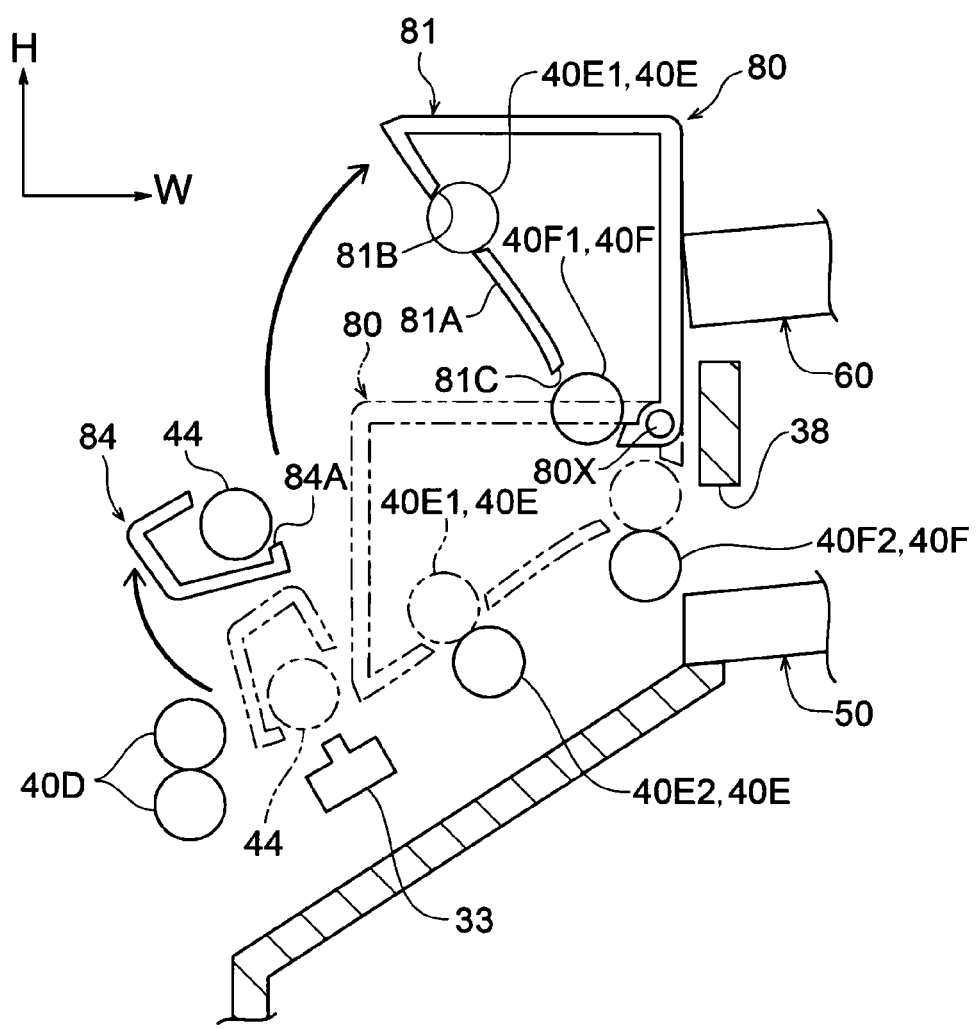
FIG. 15 is a side view illustrating a state where the modification of the second opening and closing member according to the present exemplary embodiment is open.
Figure 16:
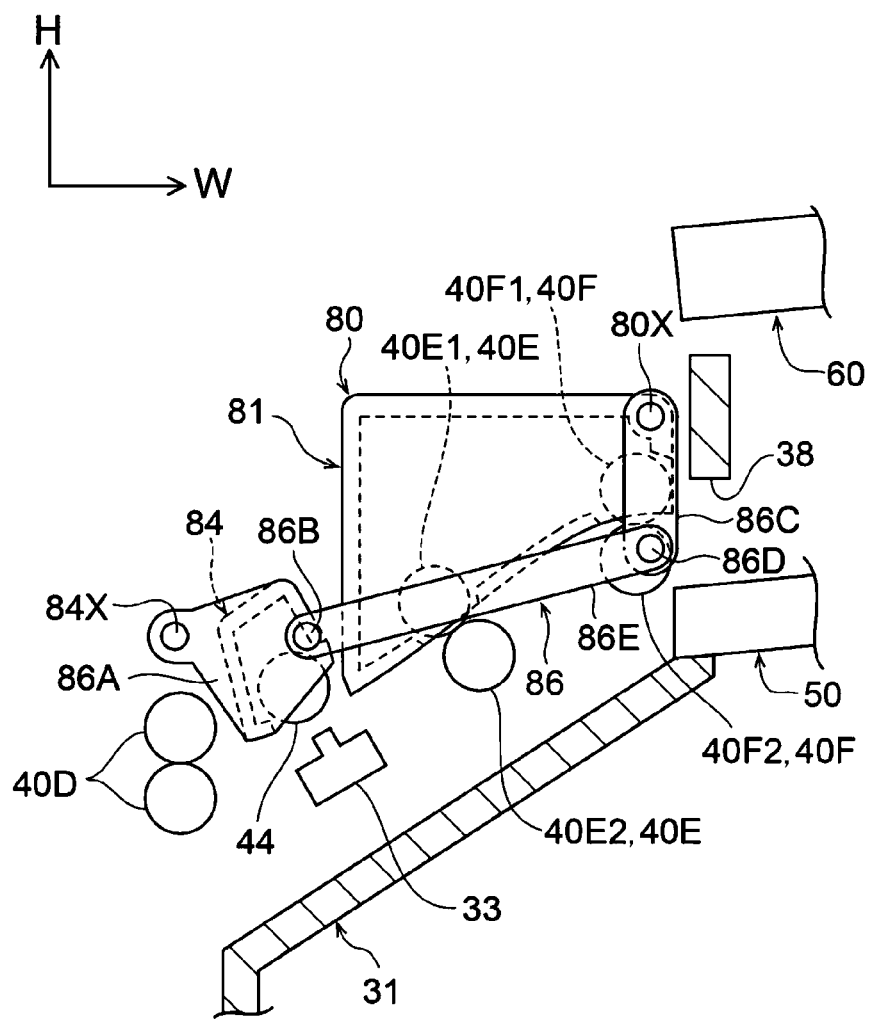
FIG. 16 is a side view illustrating a state of the link mechanism in the state illustrated in FIG. 14.
Figure 17:
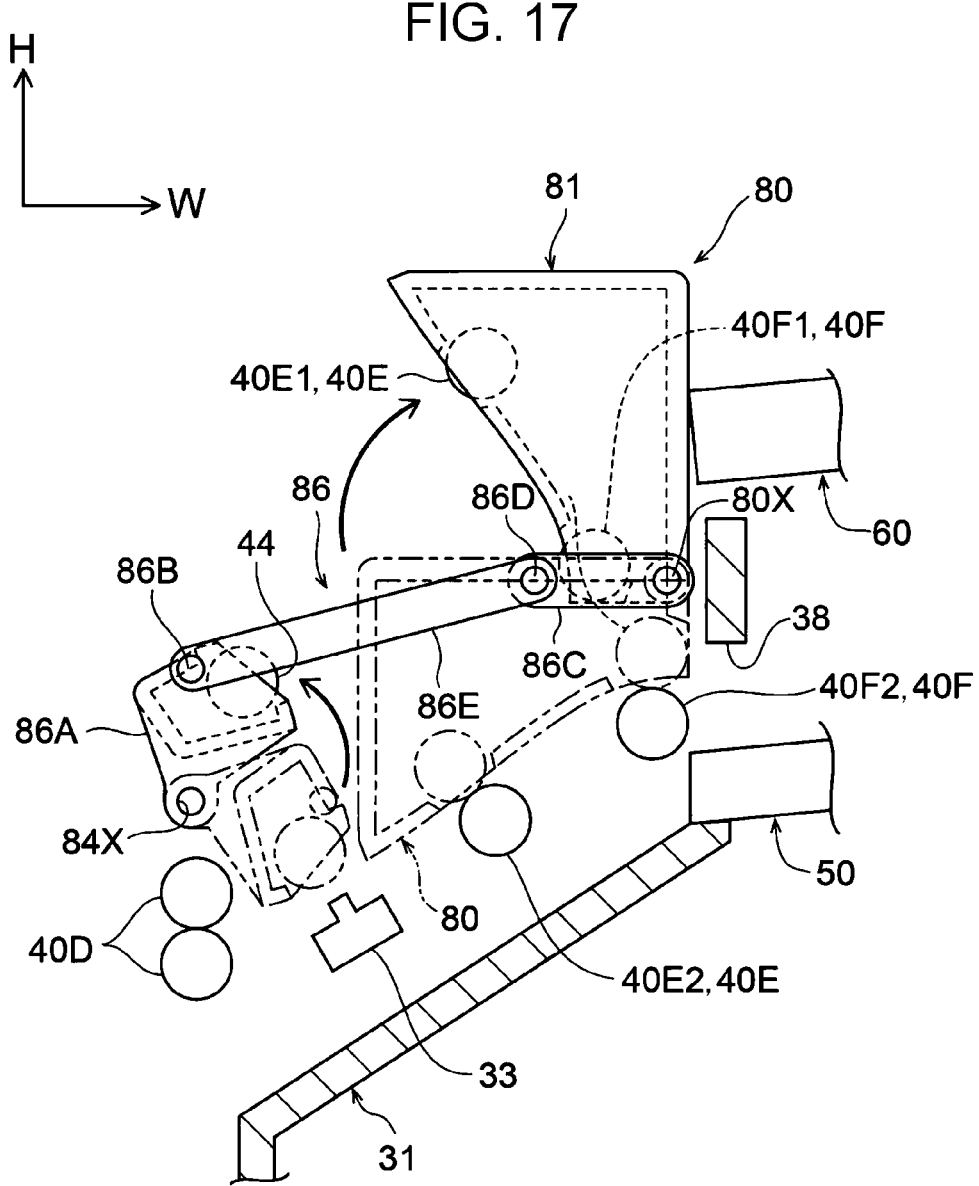
FIG. 17 is a side view illustrating a state of the link mechanism in the state illustrated in FIG. 15.

In the image reading section 30, although the chute 35 is used as an example of the second opening and closing member of the present disclosure, and the opposing member 44 is attached to the chute 35, the image reading section 30 is not limited to having this configuration. For example, a configuration in which the opposing member 44 is not attached to the chute 35 like a chute 80 that is illustrated in FIG. 14 to FIG. 16 may be employed. More specifically, the transport member 40E1 and the transport member 40F1 are attached to the inside of a housing 81 of the chute 80. In contrast, the opposing member 44 is provided with a housing 84 that has the shape of a box. The opposing member 44 is moved from a position where the opposing member 44 is opposed to the reading sensor 33 in conjunction with an opening operation of the chute 80. More specifically, the opposing member 44 and the chute 80 are connected to each other by a link mechanism 86. When the chute 80 is opened, the opposing member 44 is moved by the link mechanism 86 in conjunction with this opening operation of the chute 80. As illustrated in FIG. 15 and FIG. 16, the link mechanism 86 includes a plate-shaped link 86A, a shaft portion 84X of the housing 84, a pin 86B attached to the link 86A, a link 86C attached to the front surface of the housing 84, a shaft portion 80X of the housing 81, a pin 86D attached to the link 86C, and a link 86E connecting the pin 86B and the pin 86D to each other. In the above modification, the link mechanism 86 moves the opposing member 44 away from the reading sensor 33 in conjunction with the opening operation of the chute 80.

In the above-described exemplary embodiment, although a four-link mechanism is used as each of the link mechanisms, each of the link mechanisms is not limited to four-link mechanism. Other link mechanisms may be used as the link mechanisms. For example, slider crank mechanisms may be used.

In the above-described exemplary embodiment, although the image reading section 30 is provided in the upper portion of the image forming apparatus 10, and the image forming section 12 is provided in the lower portion of the image forming apparatus 10, the present disclosure is not limited to this configuration. For example, the image reading device may be formed of the image reading section 30, the document table 50, the ejection unit 60, and the document table 70.

The present disclosure is not limited to the above-described exemplary embodiment, and various modifications, changes, and improvements may be made within the gist of the present disclosure. For example, the above-described modifications may be suitably combined with one another.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image reading device comprising:
   a housing that includes a transport path along which a document is transported;
   an opening and closing member that is attached to the housing in such a mariner as to be openable and closable;
   a reading unit that is disposed in such a manner as to be positioned between the transport path and the opening and closing member and that reads an image from the document, which is transported along the transport path; and
   an opposing member that is disposed in such a manner as to be opposed to the reading unit with the transport path interposed between the opposing member and the reading unit and that is moved away from the reading unit in conjunction with an opening operation of the opening and closing member,
   wherein the opposing member is configured to move relative to both the opening and closing member and the reading unit in conjunction with the opening operation of the opening and closing member.

2. The image reading device according to claim 1, further comprising:
   a link mechanism that moves the opposing member away from the reading unit in conjunction with the opening operation of the opening and closing member.

3. An image reading device comprising:
   a housing that includes a transport path along which a document is transported;
   a first reading unit that is disposed on the transport path and that reads an image from a first surface of the document, which is transported along the transport path;
   a second reading unit that is disposed on the transport path in such a manner as to be located downstream from the first reading unit and that reads an image from a second surface of the document, which is transported along the transport path, the second surface being opposite to the first surface of the document;
   a first opening and closing member that is attached to the housing in such a manner as to be openable and closable and that exposes the first reading unit when the first opening and closing member is open; and
   a second opening and closing member that is attached to the housing in such a manner as to be openable and closable and that exposes the second reading unit when the second opening and closing member is open.

4. The image reading device according to claim 3,
   wherein the second reading unit is covered when the first opening and closing member is open and the second opening and closing member is closed.

5. The image reading device according to claim 4, further comprising:
   a first opposing member that is disposed in such a manner as to be opposed to the first reading unit with the transport path interposed between the first opposing member and the first reading unit and that is moved away from the first reading unit in conjunction with an opening operation of the first opening and closing member.

6. The image reading device according to claim 5, further comprising:
a first link mechanism that moves the first opposing member away from the first reading unit in conjunction with the opening operation of the first opening and closing member.

7. The image reading device according to claim 5,
wherein the first reading unit is oriented in a direction in which the first opening and closing member is opened.

8. The image reading device according to claim 4,
wherein the first reading unit is oriented in a direction in which the first opening and closing member is opened.

9. The image reading device according to claim 3, further comprising:
a first opposing member that is disposed in such a manner as to be opposed to the first reading unit with the transport path interposed between the first opposing member and the first reading unit and that is moved away from the first reading unit in conjunction with an opening operation of the first opening and closing member.

10. The image reading device according to claim 9, further comprising:
a first link mechanism that moves the first opposing member away from the first reading unit in conjunction with the opening operation of the first opening and closing member.

11. The image reading device according to claim 10,
wherein the first reading unit is oriented in a direction in which the first opening and closing member is opened.

12. The image reading device according to claim 9,
wherein the first reading unit is oriented in a direction in which the first opening and closing member is opened.

13. The image reading device according to claim 3,
wherein the first reading unit is oriented in a direction in which the first opening and closing member is opened.

14. The image reading device according to claim 3, further comprising:
a second opposing member that is disposed in such a manner as to be opposed to the second reading unit with the transport path interposed between the second opposing member and the second reading unit and that is moved away from the second reading unit in conjunction with an opening operation of the second opening and closing member.

15. The image reading device according to claim 14, further comprising:
a second link mechanism that moves the second opposing member away from the second reading unit in conjunction with the opening operation of the second opening and closing member.

16. The image reading device according to claim 3,
wherein the second reading unit is oriented in a direction in which the second opening and closing member is opened.

17. The image reading device according to claim 3,
wherein the first opening and closing member includes a first transport-path component that forms an upstream portion of the transport path, the upstream portion being located upstream from the first reading unit.

18. The image reading device according to claim 3,
wherein the second opening and closing member includes a second transport-path component that forms a downstream portion of the transport path, the downstream portion including a region in which the second reading unit is disposed.

19. The image reading device according to claim 3,
wherein the second opening and closing member is covered with the first opening and closing member.

20. An image forming apparatus comprising:
the image reading device according to claim 1 that reads an image from a document; and
an image forming unit that forms an image onto a recording medium based on image information read by the image forming unit.

* * * * *